(12) United States Patent
Koga

(10) Patent No.: US 10,656,406 B2
(45) Date of Patent: May 19, 2020

(54) IMAGE PROCESSING DEVICE, IMAGING DEVICE, MICROSCOPE SYSTEM, IMAGE PROCESSING METHOD, AND COMPUTER-READABLE RECORDING MEDIUM

(71) Applicant: OLYMPUS CORPORATION, Tokyo (JP)

(72) Inventor: Shunichi Koga, Hino (JP)

(73) Assignee: OLYMPUS CORPORATION, Tokyo (JP)

(*) Notice: Subject to any disclaimer, the term of this patent is extended or adjusted under 35 U.S.C. 154(b) by 282 days.

(21) Appl. No.: 15/804,334

(22) Filed: Nov. 6, 2017

(65) Prior Publication Data
US 2018/0059398 A1 Mar. 1, 2018

Related U.S. Application Data

(63) Continuation of application No. PCT/JP2015/066406, filed on Jun. 5, 2015.

(51) Int. Cl.
*G02B 21/36* (2006.01)
*G06T 7/73* (2017.01)
*G06T 5/50* (2006.01)
*H04N 5/357* (2011.01)
*G06T 5/00* (2006.01)
*G02B 21/26* (2006.01)
(Continued)

(52) U.S. Cl.
CPC ........... *G02B 21/365* (2013.01); *G02B 21/26* (2013.01); *G06T 5/008* (2013.01); *G06T 5/50* (2013.01); *G06T 7/74* (2017.01); *H04N 5/2351* (2013.01); *H04N 5/23229* (2013.01); *H04N 5/243* (2013.01); *H04N 5/3572* (2013.01); *G06T 2207/10012* (2013.01); *G06T 2207/10024* (2013.01)

(58) Field of Classification Search
CPC .......................................... G02B 21/361–368
USPC ..................................................... 348/79–80
See application file for complete search history.

(56) References Cited

U.S. PATENT DOCUMENTS

2009/0147106 A1  6/2009  Sakamoto et al.
2013/0329033 A1  12/2013  Shibata et al.

FOREIGN PATENT DOCUMENTS

| JP | 2009130395 A | 6/2009 |
| JP | 2010021649 A | 1/2010 |
| JP | 2013257422 A | 12/2013 |

OTHER PUBLICATIONS

International Search Report dated Aug. 25, 2015 issued in PCT/JP2015/066406.

*Primary Examiner* — James M Anderson, II
(74) *Attorney, Agent, or Firm* — Scully, Scott, Murphy & Presser, P.C.

(57) ABSTRACT

An image processing device includes: an image acquisition unit configured to acquire first and second image groups in different first and second directions; a flatness calculation unit configured to calculate first flatness representing a gradient of a shading component in the first direction and calculate second flatness representing a gradient of a shading component in the second direction; a flat area detection unit configured to detect an area, as a flat area, including a position having a minimum gradient of a shading component in an image based on the first and second flatness; and a correction gain calculation unit configured to calculate a correction gain for correcting shading in an image with reference to a correction gain in the flat area by using a luminance ratio in the common area.

14 Claims, 18 Drawing Sheets

(51) Int. Cl.
*H04N 5/232* (2006.01)
*H04N 5/235* (2006.01)
*H04N 5/243* (2006.01)

IMAGE PROCESSING DEVICE, IMAGING DEVICE, MICROSCOPE SYSTEM, IMAGE PROCESSING METHOD, AND COMPUTER-READABLE RECORDING MEDIUM

CROSS-REFERENCE TO RELATED APPLICATION

This application is a continuation of International Application No. PCT/JP2015/066406, filed on Jun. 5, 2015, the entire contents of which are incorporated herein by reference.

BACKGROUND

The present disclosure relates to an image processing device, an imaging device, a microscope system, an image processing method, and a computer-readable recording medium.

In recent years, techniques of recording images obtained by imaging specimens mounted on glass slides as electronic data for observation of the images by a user on a monitor has been used. As one of the techniques, a technique called as a virtual slide technique is known to sequentially stitch partial images of a specimen enlarged by a microscope to construct a high resolution image showing the whole of a specimen. The virtual slide technique is a technique acquiring a plurality of images of different fields of view in the same object, joining these images, and generating an image of an enlarged field of view in the object.

Incidentally, microscopes include a light source configured to illuminate a specimen, and an optical system configured to enlarge an image of a specimen. An image sensor configured to covert an enlarged image of a specimen to electronic data is provided subsequent to the optical system. Therefore, a problem of generation of uneven brightness in an acquired image is caused due to uneven brightness of the light source, non-uniformity in the optical system, unevenness in characteristic of the image sensor, or the like. The uneven brightness is called shading, and brightness is usually reduced with increasing distance from a center of an image that corresponds to a position of an optical axis of an optical system. Therefore, when a plurality of images is stitched to generate a virtual slide image, an unnatural boundary is disadvantageously generated at a seam between images. Furthermore, since a plurality of images is stitched to repeat shading, it looks like a specimen has periodic patterns.

Against such a problem, a shading correction technique is known to previously acquire a shading pattern as a calibration image to correct an image showing a specimen based on the calibration image. For example, in JP 2013-257422 A, a technique is disclosed to capture a reference view image being an image within a range of a predetermined field of view of a sample, move a position of the sample relative to an optical system to capture a plurality of peripheral view images each including a predetermined area within the predetermined field of view and being an image within a range of a peripheral field of view different from the range of the predetermined field of view, calculate a correction gain in each pixel of the reference view image based on the reference view image and the peripheral view image, and perform shading correction.

SUMMARY

An image processing device may include: an image acquisition unit configured to acquire first and second image groups in different first and second directions, the first and second image groups each including two images having a common area partially showing a common object between one image and another image; a flatness calculation unit configured to calculate first flatness representing a gradient of a shading component in the first direction based on a luminance ratio in the common area between the two images included in the first image group, and calculate second flatness representing a gradient of a shading component in the second direction based on a luminance ratio in the common area between the two images included in the second image group; a flat area detection unit configured to detect an area, as a flat area, including a position having a minimum gradient of a shading component in an image based on the first and second flatness; and a correction gain calculation unit configured to calculate a correction gain for correcting shading in an image with reference to a correction gain in the flat area by using a luminance ratio in the common area.

The above and other features, advantages and technical and industrial significance of this disclosure will be better understood by reading the following detailed description of presently preferred embodiments of the disclosure, when considered in connection with the accompanying drawings.

DETAILED DESCRIPTION

Figure 1:
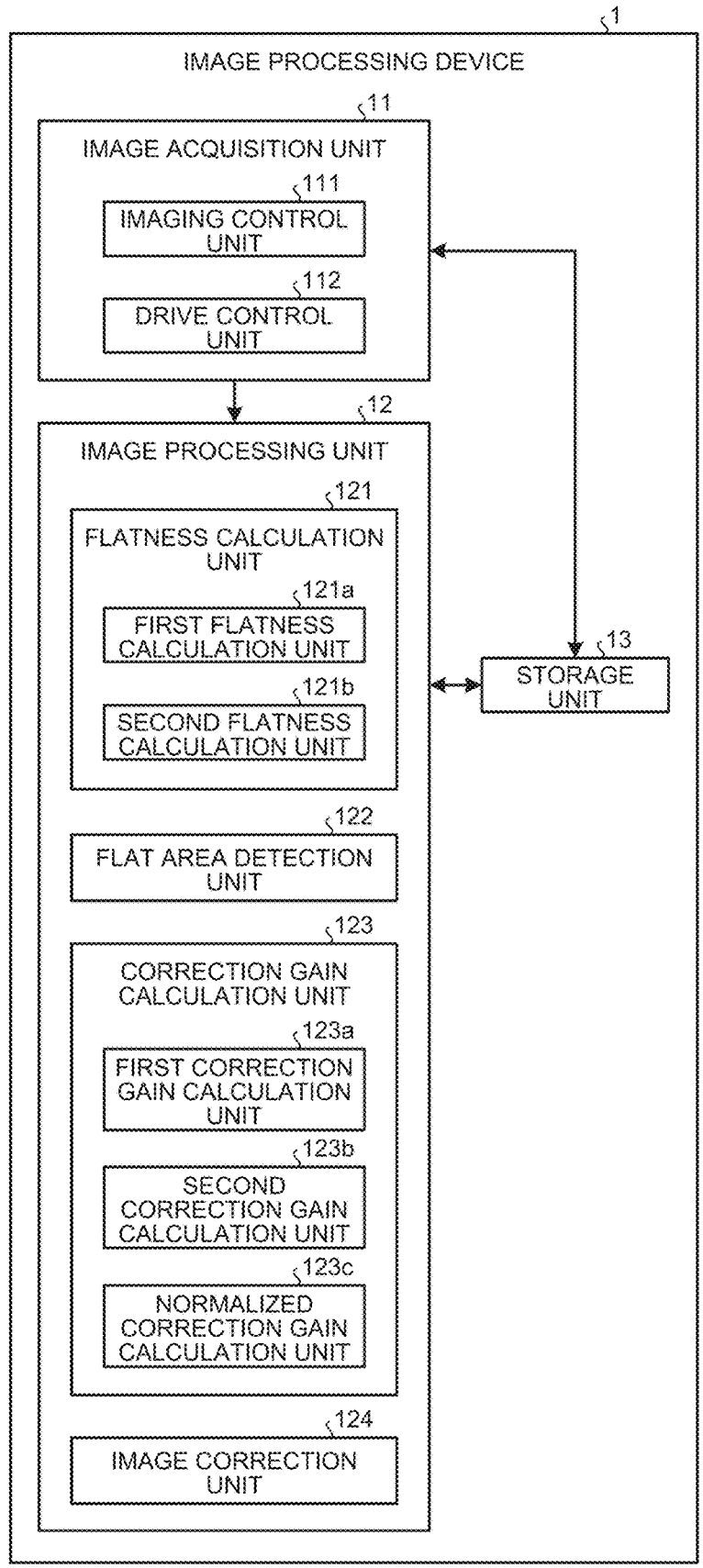
FIG. 1 is a block diagram illustrating an exemplary configuration of an image processing device according to a first embodiment.

Hereinafter, embodiments of an image processing device, an imaging device, a microscope system, an image processing method, and an image processing program will be described in detail with reference to the drawings. Note that the present disclosure is not limited to these embodiments. Furthermore, in the drawings, the same portions are denoted by the same reference signs.

First Embodiment

FIG. 1 is a block diagram illustrating an exemplary configuration of an image processing device according to a first embodiment. As illustrated in FIG. 1, an image processing device 1 according to the first embodiment includes an image acquisition unit 11 configured to acquire an image showing an object to be observed, an image processing unit 12 configured to subject the image to image processing, and a storage unit 13.

The image acquisition unit 11 acquires a plurality of images of different fields of view. The image acquisition unit 11 may directly acquire a plurality of images from an imaging device connected to the image processing device 1, or acquire a plurality of images through a network, a storage device, or the like. In the first embodiment, images are directly acquired from the imaging device. Note that the kind of the imaging device is not particularly limited, and for example, a microscope device including an imaging function, or a digital camera may be employed.

Figure 2:
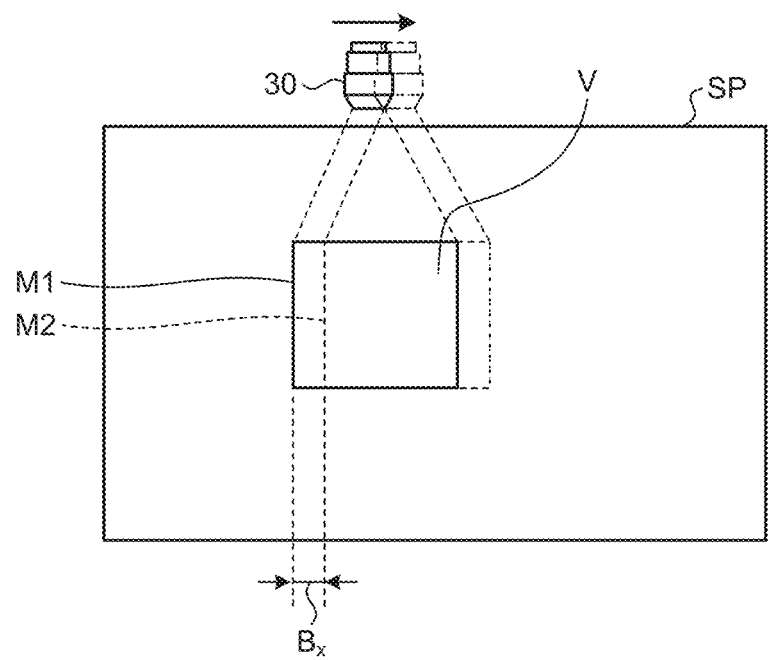
FIG. 2 is a schematic diagram illustrating an object imaging method.
Figure 3:
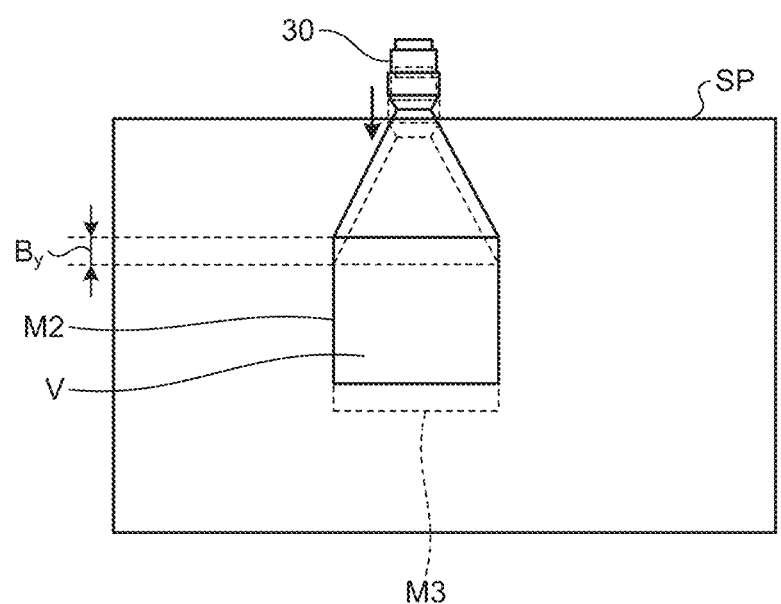
FIG. 3 is a schematic diagram illustrating an object imaging method.

FIGS. 2 and 3 are schematic diagrams illustrating operation of the image acquisition unit 11, and illustrate an object SP, an optical system 30 including the imaging device to form an image of the object SP, and a field of view V of the optical system 30. In FIGS. 2 and 3, for easy understanding of a position of the field of view V in the object SP or an imaging method, the position of the optical system 30 is shifted relative to the object SP and the field of view V, as viewed from in front of the drawings, and a side surface of the optical system 30 is illustrated outside the object SP to show a positional relationship with the field of view V. In the followings, in a plane including the field of view V, a direction parallel with one side of the field of view V is defined as a horizontal direction, and a direction perpendicular to the one side is defined as a vertical direction.

The image acquisition unit 11 includes an imaging control unit 111 configured to control imaging operation of the imaging device, and a drive control unit 112 configured to control the change of the position of the field of view V relative to the object SP. The drive control unit 112 relatively moves any or both of the optical system 30 and the object SP to change the position of the field of view V relative to the object SP. FIG. 2 illustrates movement of the optical system 30 in a horizontal direction, and FIG. 3 illustrates movement of the optical system 30 in a vertical direction. The imaging control unit 111 causes the imaging device to perform imaging at predetermined appropriate time, in cooperation with controlling operation of the drive control unit 112, and captures images M1, M2, . . . showing the object in the field of view V from the imaging device.

In the present first embodiment, an example of movement of the field of view V in two directions of the horizontal direction and the vertical direction which are orthogonal to each other, but as long as the field of view V is moved in two different directions, the movement directions of the field of view V are not limited to the horizontal direction or the vertical direction. Furthermore, two directions in which the field of view V is moved are not necessarily orthogonal to each other. Hereinafter, a position of each pixel in the images M1, M2, . . . are represented as (x,y).

The image processing unit 12 performs image processing using a plurality of images acquired by the image acquisition unit 11 to correct shading generated in an image. Specifically, the image processing unit 12 includes a flatness calculation unit 121 configured to calculate flatness being a gradient of shading generated in an image, a flat area detection unit 122 configured to detect, from an image, a flat area in which shading hardly occurs and which has a minimum gradient of a shading component, a correction gain calculation unit 123 configured to calculate a correction gain for correcting shading at each position in an image, and an image correction unit 124 configured to perform shading correction. Hereinafter, the correction gain for correcting shading is simply referred to as a correction gain.

The flatness calculation unit 121 includes a first flatness calculation unit 121a and a second flatness calculation unit 121b. Here, the flatness is an index representing the gradient of the shading component between adjacent pixels or between pixels several pixels away from each other. The first flatness calculation unit 121a calculates flatness in the horizontal direction based on the two images M1 and M2 (first image group, see FIG. 2) acquired by moving the field of view V in the horizontal direction (first direction) relative to the object SP. In contrast, the second flatness calculation unit 121b calculates flatness in the vertical direction based on two images M2 and M3 (second image group, see FIG. 3) acquired by moving the field of view V in the vertical direction (second direction) relative to the object SP.

The flat area detection unit 122 detects an area, in an image, in which shading hardly occurs and the shading component hardly changes, based on the flatness in the horizontal direction and the vertical direction calculated by the flatness calculation unit 121. Hereinafter, such an area is referred to as a flat area.

The correction gain calculation unit 123 includes a first correction gain calculation unit 123a, a second correction gain calculation unit 123b, and a normalized correction gain calculation unit 123c.

The first correction gain calculation unit 123a uses a luminance ratio in a common area in a horizontal direction, that is, a common area between the images M1 and M2 to calculate a correction gain with reference to a luminance of a column of pixels including the flat area or a column of small sections including the flat area.

The second correction gain calculation unit 123b uses a luminance ratio in a common area in a vertical direction, that is, a common area between the images M2 and M3 to calculate a correction gain with reference to a luminance of a row of pixels including the flat area or a row of small sections including the flat area.

The normalized correction gain calculation unit 123c uses the correction gains calculated by the first correction gain calculation unit 123a and the second correction gain calculation unit 123b to calculate a correction gain in a pixel or small section other than the flat area, with reference to the flat area.

The image correction unit 124 uses the correction gain in each pixel calculated by the correction gain calculation unit 123 to perform shading correction for at least any of the images M1, M2, . . . acquired by the image acquisition unit 11. Alternatively, an image captured through the optical system 30 in the same environment as the images M1 to M3 may be subjected to the shading correction.

The storage unit 13 includes a semiconductor memory, such as a rewritable flash memory, a RAM, or a ROM a recording medium, such as a hard disk, an MO, a CD-R, or a DVD-R, and a storage device, such as a reader/writer performing writing and reading of information to the recording medium. The storage unit 13 stores various parameters used for control of the imaging device by the image acquisition unit 11, image data of an image subjected to image processing by the image processing unit 12, and various parameters or the like calculated by the image processing unit 12.

The image acquisition unit 11 and the image processing unit 12 includes a general-purpose processor, such as a central processing unit (CPU), or a dedicated processor, such as various calculation circuit performing a specific function, including an application specific integrated circuit (ASIC). When the image acquisition unit 11 and the image processing unit 12 are the general-purpose processor, various programs stored in the storage unit 13 are read to, for example, give directions or transfer data to the units of the image processing device 1 or perform data transfer, and the operation of the whole image processing device 1 is integrally controlled. Furthermore, when the image acquisition unit 11 and the image processing unit 12 are the dedicated processor, the processor may perform various processing by itself, or the processor and the storage unit 13 cooperated with each other or connected to each other may perform various processing, using various data or the like stored in the storage unit 13.

Figure 4:
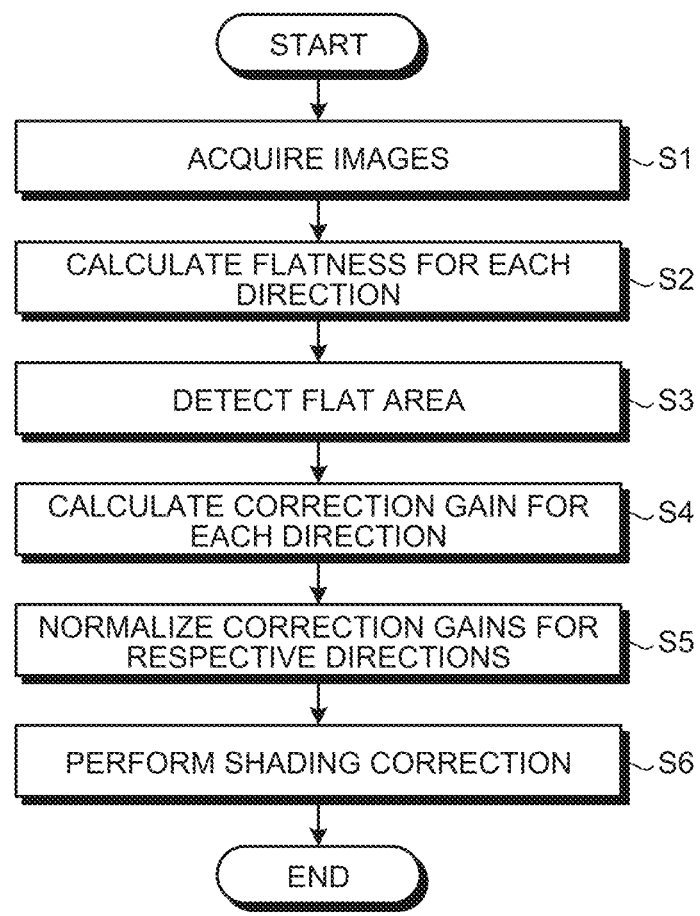
FIG. 4 is a flowchart illustrating operation of the image processing device illustrated in FIG. 1.

Next, operation of the image processing device 1 will be described. FIG. 4 is a flowchart illustrating the operation of the image processing device 1. In the followings, as one example, the images M1 to M3 illustrated in FIG. 2 and FIG. 3 which show the object SP are acquired and a correction process is performed on the image.

Firstly, in step S1, the image acquisition unit 11 acquires a plurality of images generated by capturing the object SP while moving the field of view V in different two directions by a predetermined amount. Specifically, the drive control unit 112 moves any of the object SP and the optical system 30 to move the field of view V in a predetermined direction, and the imaging control unit 111 controls the field of view V to partially overlaps that of another image in the movement direction of the field of view V. Specifically, as illustrated in FIG. 2, the images M1 and M2 where the field of view V is shifted in the horizontal direction by a width $B_x$, and the images M2 and M3 where the field of view V is shifted in the vertical direction by a width $B_y$. Note that the width (displacement between images) $B_x$ and $B_y$ are represented by the number of pixels.

Figure 5:
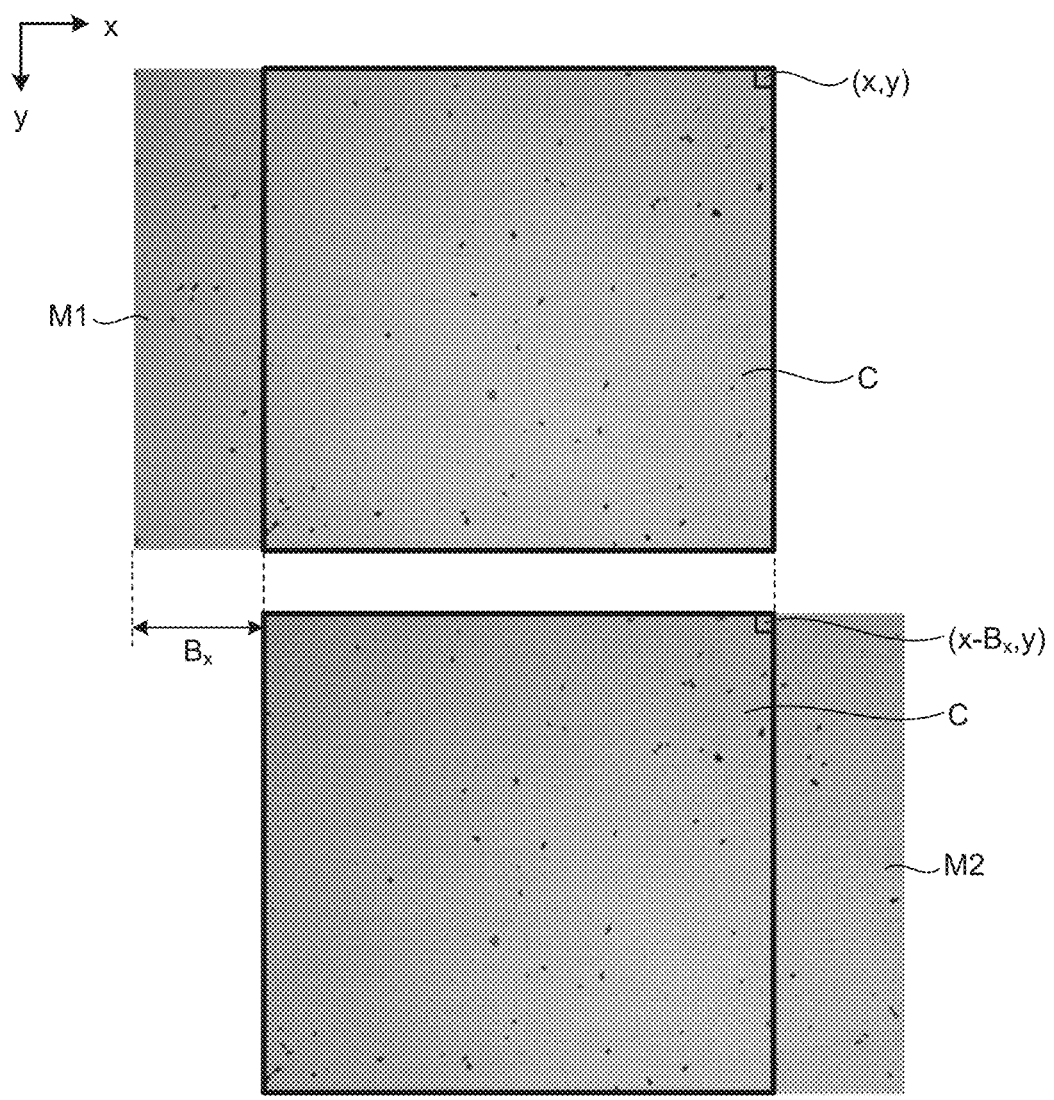
FIG. 5 is a diagram illustrating images captured with fields of view shifted from each other.

FIG. 5 is a diagram illustrating the images M1 and M2 captured with the fields of view V shifted from each other in the horizontal direction. Between the images M1 and M2, an area of the image M1 excepting the width $B_x$ at a left end thereof and an area of the image M2 excepting the width $B_x$ at a right end thereof are a common area C having a common texture component. Hereinafter, a luminance of each pixel in the image M1 is represented by $I_1(x,y)$, a texture component constituting the luminance $I_1(x,y)$ by $T_1(x,y)$, and a shading component in the horizontal direction is represented by $Sh(x,y)$. Similarly, a pixel value (luminance) of each pixel in the image M2 is represented by $I_2(x,y)$, a texture component constituting the luminance $I_2(x,y)$ is represented by $T_2(x,y)$, and a shading component is represented by $Sh(x,y)$. That is, the luminance $I_1(x,y)$ and $I_2(x,y)$ is given by the following formulas (1) and (2), respectively.

$$I_1(x,y)=T_1(x,y) \times Sh(x,y) \tag{1}$$

$$I_2(x,y)=T_2(x,y) \times Sh(x,y) \tag{2}$$

In next step S2, the flatness calculation unit 121 calculates a flatness for each of the horizontal direction and the vertical direction.

As illustrated in FIG. 5, when the field of view V is shifted by the width $B_x$ in the horizontal direction, between the images M1 and M2, texture components $T_1(x,y)$ and $T_2(x-B_x,y)$ are common between a pixel (x,y) in the image M1 and a pixel $(x-B_x,y)$ in the image M2. Accordingly, the following formula (3) holds.

$$T_1(x, y) = T_2(x - B_x, y) = \frac{I_1(x, y)}{Sh(x, y)} = \frac{I_2(x - B_x, y)}{Sh(x - B_x, y)} \tag{3}$$

That is, a luminance ratio between the pixels having the texture components $T_1(x,y)$ and $T_2(x-B_x,y)$ in common represents a ratio of the shading component Sh between the pixels separated in the horizontal direction by width $B_x$. Therefore, in the present first embodiment, the logarithm of the ratio of the shading component Sh between the pixels separated in the horizontal direction by width $B_x$ is calculated to calculate an absolute value of the logarithm as a flatness $Flat_h$ in the horizontal direction, as shown in the following formula (4).

$$\begin{aligned} Flat_h &= \text{Abs}\left\{\log\left(\frac{I_1(x, y)}{I_2(x - B_x, y)}\right)\right\} \\ &= \text{Abs}\left\{\log\left(\frac{T \times Sh(x, y)}{T \times Sh(x - B_x, y)}\right)\right\} \\ &= \text{Abs}\{\log(Sh(x, y)) - \log(Sh(x - B_x, y))\} \end{aligned} \tag{4}$$

Similarly, as shown in the following formula (5), an absolute value of the logarithm of a ratio of a shading component Sv between pixels separated in the vertical direction by width $B_y$ is calculated as a flatness $Flat_v$ in the vertical direction.

$$\begin{aligned} Flat_v &= \text{Abs}\left\{\log\left(\frac{I_2(x, y)}{I_3(x, y - B_y)}\right)\right\} \\ &= \text{Abs}\left\{\log\left(\frac{T \times Sv(x, y)}{T \times Sv(x, y - B_y)}\right)\right\} \end{aligned} \tag{5}$$

-continued $$= \text{Abs}\{\log(Sv(x, y)) - \log(Sv(x, y - B_y))\}$$

Note that, as described later, since the flatness $Flat_h$ and $Flat_v$ is used to search an area having a relatively small gradient of the shading component in an image, the logarithms used in formulas (4) and (5) may be any of a natural logarithm and a common logarithm.

Figure 6:
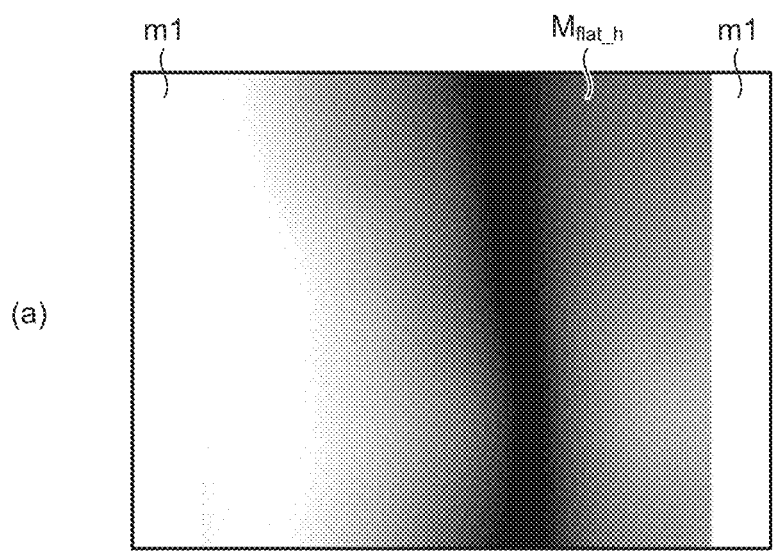
FIG. 6 is diagrams illustrating flatness distributions in horizontal and vertical directions.
Figure 6:
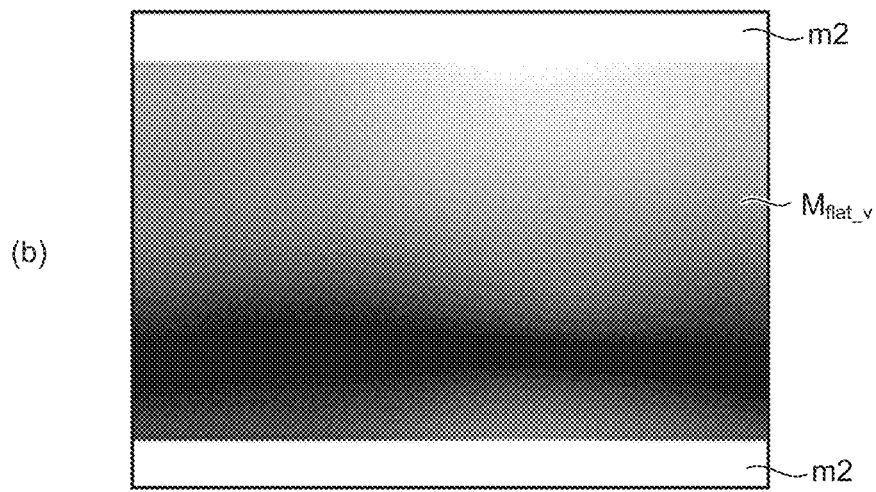

FIG. 6 illustrates flatness maps generated using the flatness $Flat_h$ and $Flat_v$ calculated using formulas (4) and (5) as pixel values, and illustrates flatness distributions in the horizontal and vertical directions. Of these, a flatness map $M_{flat\_h}$ illustrated in (a) of FIG. 6 represents a flatness distribution in the horizontal direction. Here, as illustrated in FIG. 5, since the flatness is calculated only for the common area C, the flatness map $M_{flat\_h}$ has a size smaller by width $B_x$ of either end of the images M1 and M2. Therefore, a margin m1 corresponding to width $B_x/2$ is added to both right and left ends of the flatness map $M_{flat\_h}$ to have an image size the same as those of the images M1 and M2. A margin m2 corresponding to width $B_y/2$ is added also to the upper and lower ends of a flatness map $M_{flat\_v}$ in the vertical direction illustrated in (b) of FIG. 6.

The smaller the gradient of the shading component is, that is, the closer the values of shading components $Sh_1(x,y)$ and $Sh_2(x,y)$ are, the smaller a value of the flatness $Flat_h$ is, and a pixel value in the flatness map $M_{flat\_h}$ illustrated in (a) of FIG. 6 is closer to zero (i.e., black color). The same is applied to the flatness map $M_{flat\_v}$ illustrated in (b) of FIG. 6.

In next step S3, the flat area detection unit 122 detects a flat area, based on the flatness maps $M_{flat\_h}$, $M_{flat\_v}$ for respective directions generated in step S2.

Figure 7:
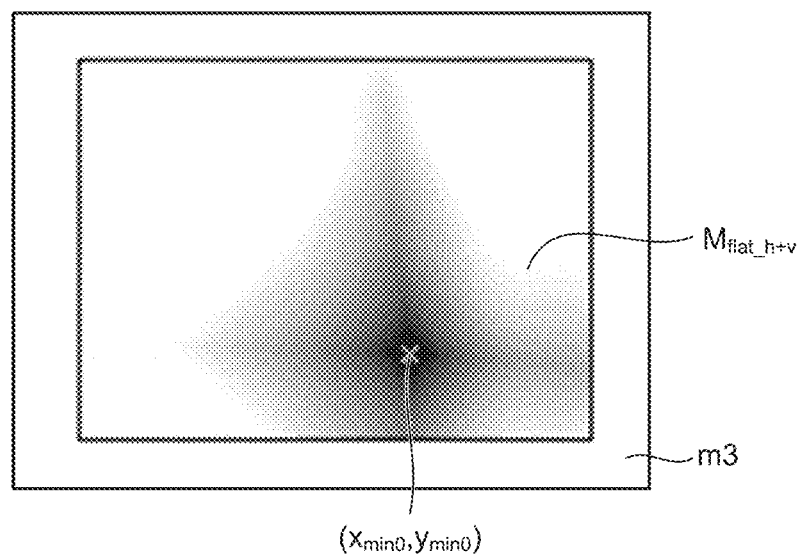
FIG. 7 is a schematic diagram illustrating a process of detecting a flat area.

Specifically, the flatness maps $M_{flat\_h}$ and $M_{flat\_v}$ for respective directions are added firstly, and a combined flatness map $M_{flat\_h+v}$ M illustrated in FIG. 7 is generated. At this time, addition is performed excluding portions of the margins m1 and m2 respectively added to the flatness map $M_{flat\_h}$, $M_{flat\_v}$, and then, a margin m3 is added around the combined flatness map $M_{flat\_h+v}$, to have an image size the same as those of the images M1 to M3.

A pixel value in the combined flatness map $M_{flat\_h+v}$, that is, a position $(x_{min0}, y_{min0})$ of a pixel having a minimum value of the sum of the flatness $Flat_h$ and $Flat_v$ is defined as the center of the flat area.

Figure 8:
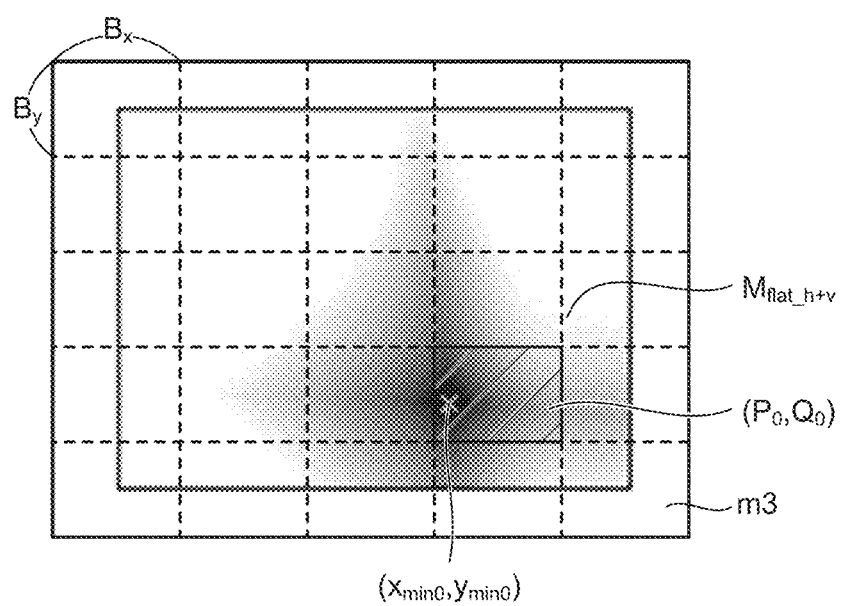
FIG. 8 is a schematic diagram illustrating a process of calculating a correction gain for each direction.
Figure 9:
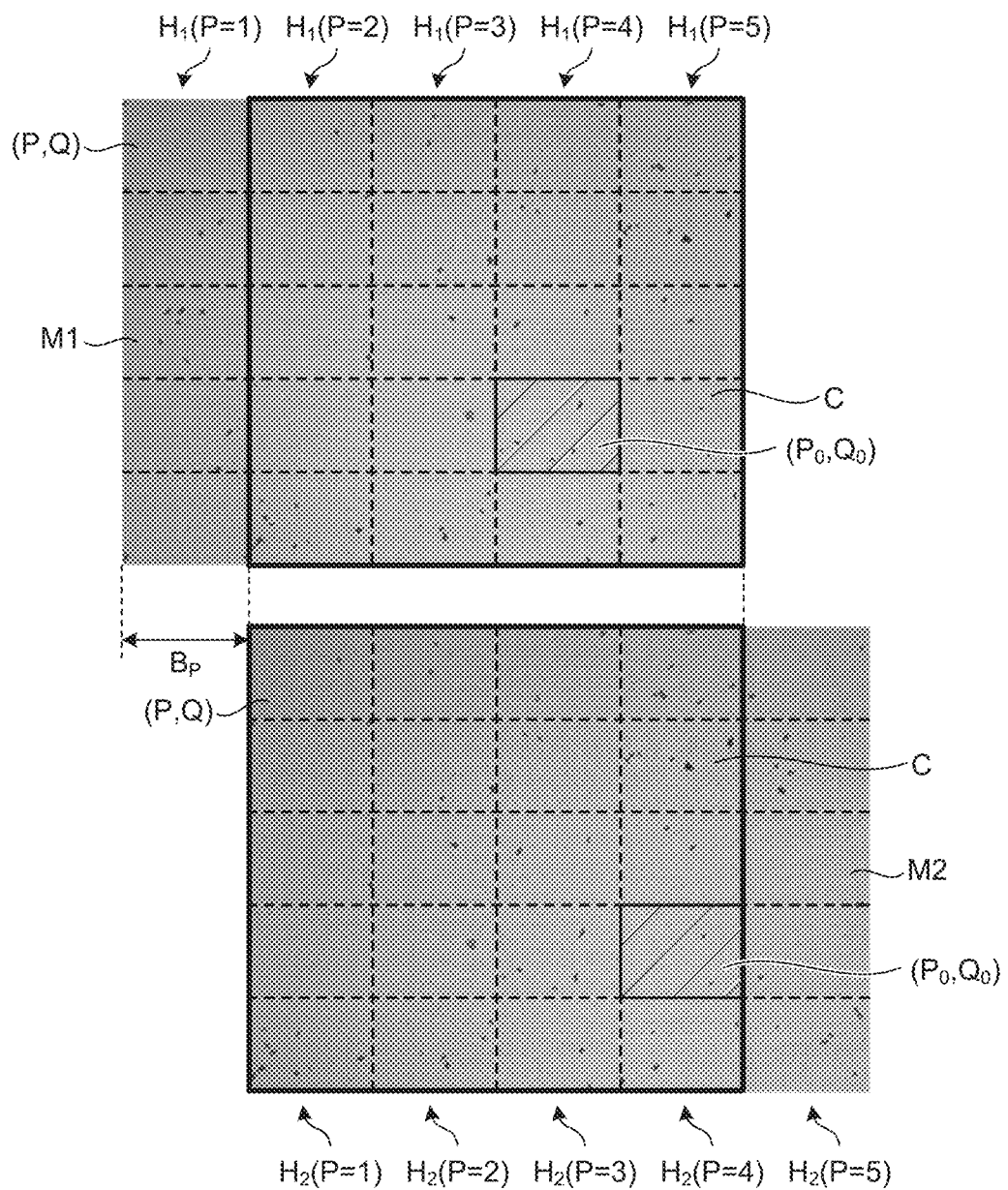
FIG. 9 is a schematic diagram illustrating a process of calculating a correction gain for each direction.

In next step S4, the correction gain calculation unit 123 divides the images M1 to M3 into a plurality of small sections having widths $B_x$ and $B_y$ by which the field of view V is shifted, upon capturing the images M1 to M3, and calculates a correction gain for each direction for each small section. FIGS. 8 and 9 are schematic diagrams illustrating a process of calculating a correction gain for each direction.

Firstly, as illustrated in FIG. 8, the correction gain calculation unit 123 divides the combined flatness map $M_{flat\_h+v}$ into small sections, and defines a small section $(P_0, Q_0)$ including the center position $(x_{min0}, y_{min0})$ of the flat area of the small sections, as a flat section having a flat gradient of shading. Then, a correction gain $G(P_0, Q_0)$ of each pixel included in the flat section $(P_0, Q_0)$ is set to 1.

Then, as illustrated in FIG. 9, the first correction gain calculation unit 123a calculates a correction gain in a horizontal direction, for a column in which a plurality of small sections are aligned, based on the images M1 and M2 where the field of view V is shifted in the horizontal direction by width $B_x$. Hereinafter, luminance of pixels in small sections belonging to columns (P=1 to 5) in the image M1 is represented by $H_1(P=1)$ to $H_1(P=5)$. Similarly, luminance of pixels in small sections belonging to columns (P=1 to 5) in the image M2 is represented by $H_2(P=1)$ to $H_2(P=5)$. Furthermore, shading components in the horizontal direction of pixels in small sections belonging to a column are represented by $Sh(P=1)$ to $Sh(P=5)$, and correction gains for correcting these shading components are represented by $Gh(P=1)$ to $Gh(P=5)$.

Wherein, $Gh(P)=1/Sh(P)$

Firstly, in the first correction gain calculation unit 123a, a correction gain $Gh(P=4)$ of each pixel in a small section belonging to a fourth column including the flat section $(P_0, Q_0)$ is assumed 1, and the correction gains $Gh(P=1)$, $Gh(P=2)$, $Gh(P=3)$, and $Gh(P=5)$ of pixels in a small section belonging to another column is calculated.

As illustrated in FIG. 9, a texture component in a second column of the image M1 and a texture component in a first column of the image M2 are common, and thus, the following formula (6) holds.

$$T_1(P=2) = T_2(P=1) = \frac{H_1(P=2)}{Sh(P=2)} = \frac{H_2(P=1)}{Sh(P=1)} \tag{6}$$

Since $Gh(P)=1/Sh(P)$, formula (6) may be transformed into the following formula (7).

$$Gh(P=1) = \frac{H_1(P=2)}{H_2(P=1)} \times Gh(P=2) \tag{7}$$

In formula (7), operation $H_1(P=1)/H_2(P=2)$ between different columns represents operation of luminance between pixels located at positions corresponding to each other between columns P=1 and P=2.

Furthermore, a texture component in a third column of the image M1 and a texture component in a second column of the image M2 are common. Furthermore, a texture component in a fourth column of the image M1 and a texture component in a third column of the image M2 are common. Accordingly, as in formulas (6) and (7), the following formulas (8-1) and (8-2) hold.

$$Gh(P=2) = \frac{H_1(P=3)}{H_2(P=2)} \times Gh(P=3) \tag{8-1}$$

$$Gh(P=3) = \frac{H_1(P=4)}{H_2(P=3)} \times Gh(P=4) \tag{8-2}$$

As described above, since $Gh(P=4)=1$, when $Gh(P=4)=1$ is substituted in formulas (7), (8-1), and (8-2), the correction gains $Gh(P=1)$, $Gh(P=2)$, and $Gh(P=3)$ are given by the following formulas (9-1), (9-2), and (9-3).

$$Gh(P=1) = \frac{H_1(P=2)}{H_2(P=1)} \times \frac{H_1(P=3)}{H_2(P=2)} \times \frac{H_1(P=4)}{H_2(P=3)} \tag{9-1}$$

$$Gh(P=2) = \frac{H_1(P=3)}{H_2(P=2)} \times \frac{H_1(P=4)}{H_2(P=3)} \tag{9-2}$$

$$Gh(P=3) = \frac{H_1(P=4)}{H_2(P=3)} \tag{9-3}$$

Furthermore, a texture component in a fifth column of the image M1 and a texture component in a fourth column of the image M2 are common, and thus, the correction gain Gh(P=5) is given by the following formula (9-4).

$$Gh(P=5) = \frac{H_2(P=4)}{H_1(P=5)} \times Gh(P=4) = \frac{H_2(P=4)}{H_1(P=5)} \qquad (9\text{-}4)$$

In contrast, the second correction gain calculation unit 123b calculates a correction gain in the vertical direction, for a row in which a plurality of small sections are aligned, based on the images M2 and M3 (see FIG. 3) where the field of view V is shifted in the vertical direction by width $B_y$. Hereinafter, luminance of pixels in small sections belonging to rows (Q=1 to 5) in the image M2 is represented by $H_2(Q=1)$ to $H_2(Q=5)$. Similarly, luminance of pixels in small sections belonging to rows (P=1 to 5) in the image M3 is represented by $H_3(Q=1)$ to $H_3(Q=5)$. Furthermore, correction gains for correcting the shading components in the vertical direction of pixels in small sections belonging to rows are represented by Gv(Q=1) to Gv(Q=5).

In the second correction gain calculation unit 123b, a correction gain Gv(P=4) of each pixel in a small section belonging to a fourth row including the flat section $(P_0,Q_0)$ is assumed 1, and correction gains Gv(Q=1), Gv(Q=2), Gv(Q=3), and Gv(Q=5) of pixels in a small section belonging to another row is calculated, as in the above process in the horizontal direction. The correction gains Gv(Q=1), Gv(Q=2), Gv(Q=3), and Gv(Q=5) are given by the following formulas (10-1) to (10-4).

$$Gv(Q=1) = \frac{H_1(Q=2)}{H_2(Q=1)} \times \frac{H_1(Q=3)}{H_2(Q=2)} \times \frac{H_1(Q=4)}{H_2(Q=3)} \qquad (10\text{-}1)$$

$$Gv(Q=2) = \frac{H_1(Q=3)}{H_2(Q=2)} \times \frac{H_1(Q=4)}{H_2(Q=3)} \qquad (10\text{-}2)$$

$$Gv(Q=3) = \frac{H_1(Q=4)}{H_2(Q=3)} \qquad (10\text{-}3)$$

$$Gv(Q=5) = \frac{H_2(Q=4)}{H_1(Q=5)} \qquad (10\text{-}4)$$

Figure 10:
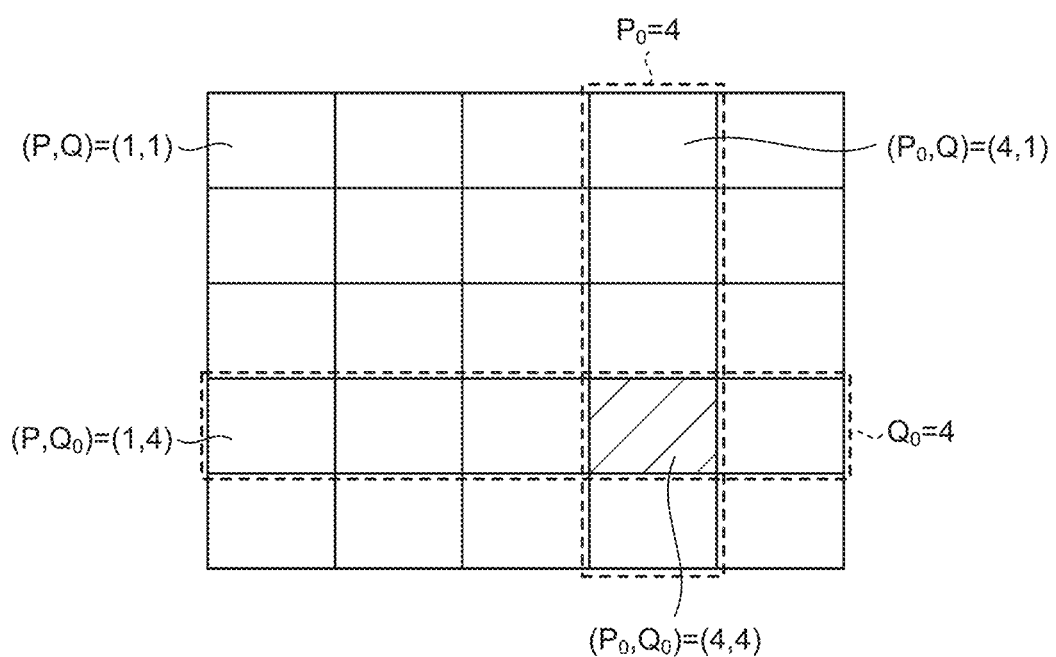
FIG. 10 is a schematic diagram illustrating a process of normalizing a correction gain.

In next step S5, the normalized correction gain calculation unit 123c normalizes the correction gains for respective directions calculated in step S4, with reference to the correction gain in the flat section $(P_0,Q_0)$. FIG. 10 is a schematic diagram illustrating a process of normalizing a correction gain. Note that, in FIG. 10, $(P_0,Q_0)=(4,4)$.

A correction gain Gh(P,Q) in a horizontal direction in a small section (P,Q) is calculated assuming that a correction gain $Gh(P_0,Q)$ in a horizontal direction in a small section $(P_0,Q)$ belonging to the same row as the small section (P,Q) and belonging to the same column as the flat section $(P_0, Q_0)$ is 1 (see formula (9-1)). Furthermore, in this small section $(P_0,Q)$, a correction gain $Gv(P_0,Q)$ in a vertical direction is obtained which is calculated assuming that the flat section $(P_0,Q_0)$ is 1 (see formula (10-1)).

Accordingly, a normalized correction gain Ghv(P,Q) obtained by normalizing the correction gain Gh(P,Q) in a horizontal direction is given by the following formula (11).

$$Ghv(P,Q)=Gh(P,Q)\times Gv(P_0,Q) \qquad (11)$$

In contrast, a correction gain Gv(P,Q) in a vertical direction in a small section (P,Q) is calculated assuming that a correction gain $Gv(P,Q_0)$ in a vertical direction in a small section $(P,Q_0)$ belonging to the same column as the small section (P,Q) and belonging to the same row as the flat section $(P_0, Q_0)$ is 1 (see formula (10-1)). Furthermore, in this small section $(P,Q_0)$, a correction gain $Gh(P,Q_0)$ in a horizontal direction is obtained which is calculated assuming that the flat section $(P_0,Q_0)$ is 1 (see formula (9-1)).

Accordingly, a normalized correction gain Gvh(P,Q) obtained by normalizing the correction gain Gv(P,Q) in a vertical direction is given by the following formula (12).

$$Gvh(P,Q)=Gv(P,Q)\times Gh(P,Q_0) \qquad (12)$$

Furthermore, the normalized correction gain calculation unit 123c combines the normalized correction gains Ghv(P, Q) and Gvh(P,Q) calculated for the same small section (P,Q), by weighted average, as shown in the following formula (13).

$$G(P,Q)=(Ghv(P,Q)+Gvh(P,Q))/2 \qquad (13)$$

A correction gain in each pixel, belonging to a correction gain G(P,Q) thus combined, is used as a correction gain G(x,y) in each position (x,y) in an image.

In next step S6, the image correction unit 124 uses the correction gain G(x,y) calculated in step S5 to perform shading correction. A luminance (i.e., texture component) T(x,y) subjected to shading correction is given by the following formula (14), using a luminance I(x,y) before shading correction.

$$T(x,y)=I(x,y)\times G(x,y) \qquad (14)$$

As described above, according to the first embodiment, a flat area in which shading hardly occurs and which has a minimum gradient of a shading component is detected from an image, and a correction gain in another area in the image is calculated with reference to a correction gain in this flat area, and thus, an accurate correction gain may be calculated. Accordingly, use of such a correction gain enables highly accurate shading correction.

Furthermore, according to the first embodiment, the process of calculating a correction gain is performed for each small section obtained by dividing an image, and such a simple process having reduced calculation enables highly accurate shading correction.

Modification 1

In the above first embodiment, as shown in formula (13), the normalized correction gains Ghv(P,Q) and Gvh(P,Q) are subjected to weighted average to calculate the correction gain G(P,Q) in the small section (P,Q), but any of the normalized correction gains Ghv(P,Q) and Gvh(P,Q) may be directly used as the correction gain G(P,Q) in the small section (P,Q). In this case, only any one of the normalized correction gains Ghv(P,Q) and Gvh(P,Q) is preferably calculated.

Second Embodiment

Next, a second embodiment will be described. An image processing device according to the present second embodiment has a configuration similar to that of the first embodiment as a whole (see FIG. 1), and is different from that of the first embodiment, in details about a process of calculating a correction gain (see steps S4 and S5 of FIG. 4) performed by the correction gain calculation unit 123.

Figure 11:
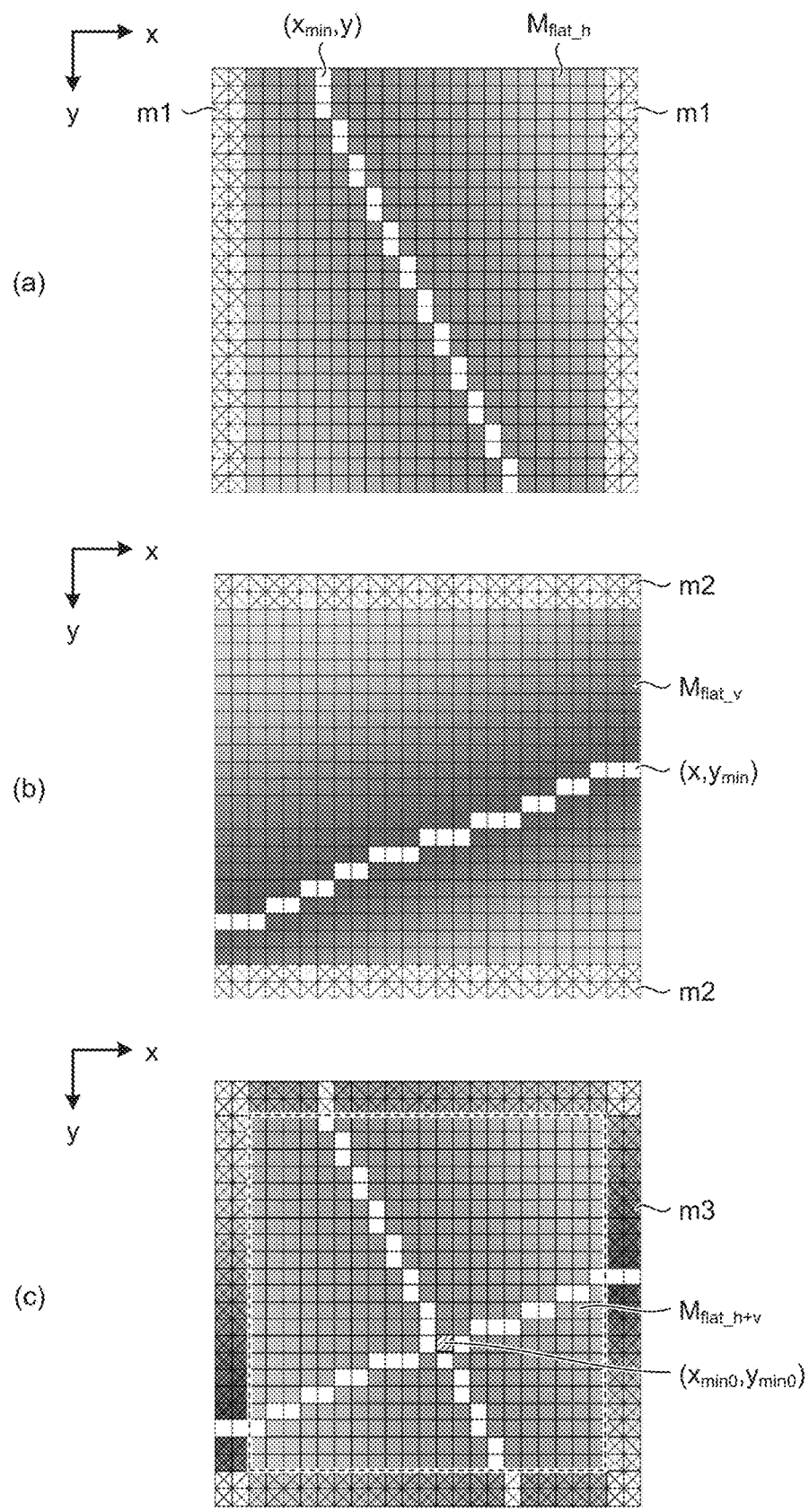
FIG. 11 is a schematic diagram illustrating a process of calculating a correction gain for each direction.
Figure 12:
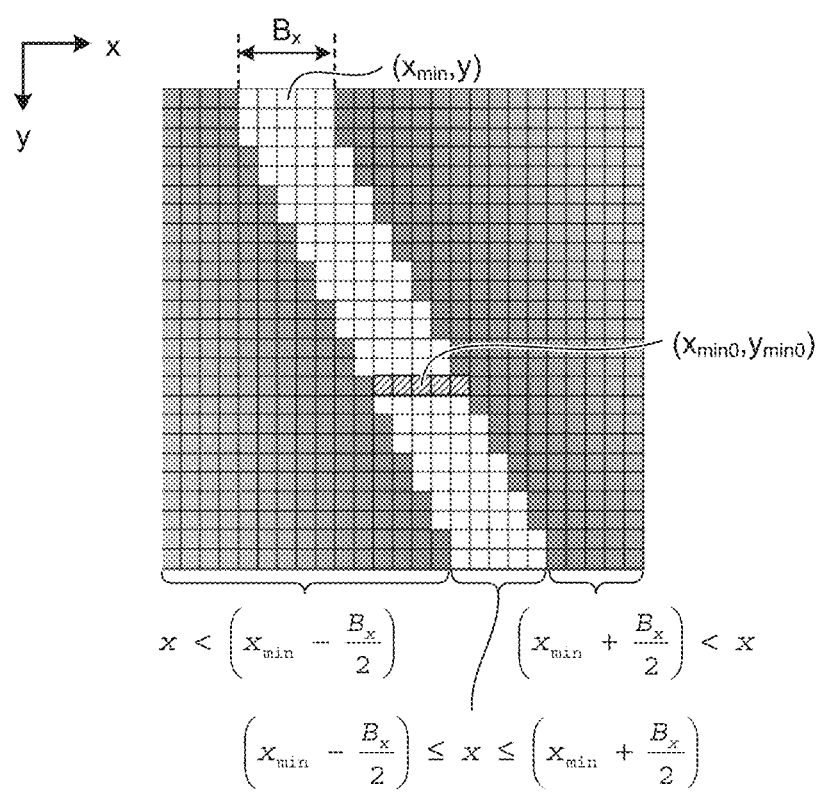
FIG. 12 is a schematic diagram illustrating a process of calculating a correction gain in a horizontal direction.
Figure 13:
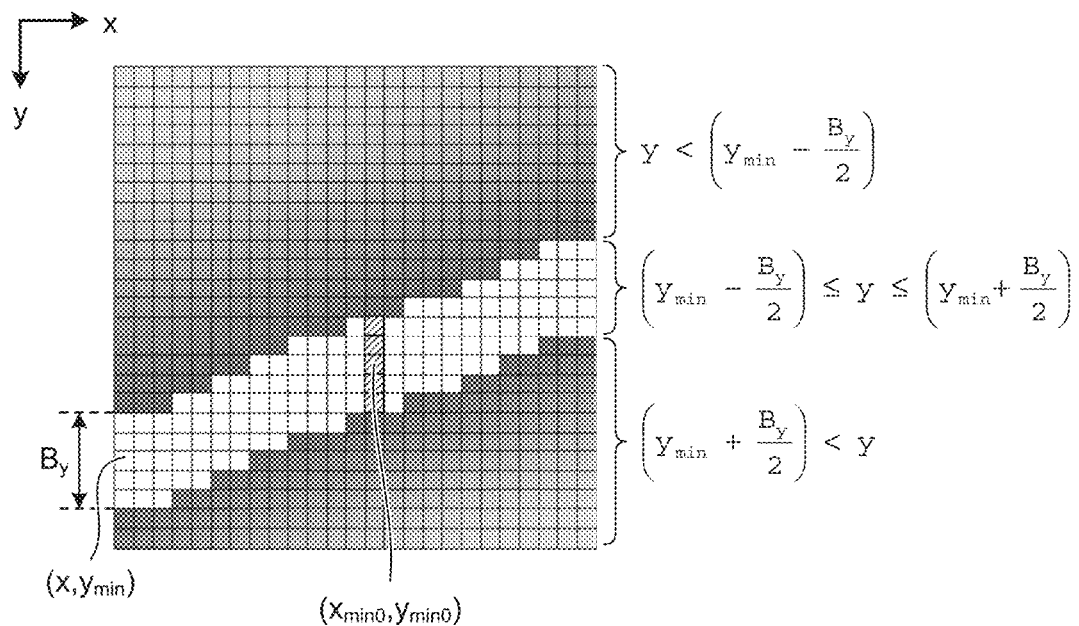
FIG. 13 is a schematic diagram illustrating a process of calculating a correction gain in a vertical direction.

When the center position $(x_{min0},y_{min0})$ is determined based on the combined flatness map $M_{flat\_h+v}$, as illustrated in FIG. 7, in step S3, the correction gain calculation unit 123 calculates a correction gain for each of the horizontal direction and the vertical direction, in next step S4. FIGS. 11 to 13 are schematic diagrams illustrating a process of calculating a correction gain for each direction. Of these, (a) and (b) of FIG. 11 are schematic diagrams illustrating the flatness maps $M_{flat\_h}$ and $M_{flat\_v}$ for respective directions illustrated in FIG. 6, and (c) of FIG. 11 is a schematic diagram illustrating the combined flatness map $M_{flat\_h+v}$ obtained by adding the flatness map $M_{flat\_h}$ and $M_{flat\_v}$ for respective directions illustrated in (a) and (b) of FIG. 11. Each of areas obtained by being divided by a grid illustrated in FIG. 11 represents one pixel. Furthermore, in FIG. 11, pixels corresponding to the margins m1 and m2 illustrated in FIG. 6 are denoted by a mark ×.

Firstly, the first correction gain calculation unit 123a detects a pixel with a flatness having a minimum value, from each row of the flatness map $M_{flat\_h}$ in the horizontal direction. In (a) of FIG. 11, a pixel at a position $(x_{min},y)$ with a flatness having a minimum value in each row is represented in white.

Furthermore, the second correction gain calculation unit 123b detects a pixel with a flatness having a minimum value, from each column of the flatness map $M_{flat\_v}$ in the vertical direction. In (b) of FIG. 11, a pixel at a position $(x,y_{min})$ with a flatness having a minimum value in each column is represented in white.

Note that in the map $M_{flat\_h+v}$ illustrated in (c) of FIG. 11, the pixels with a flatness having a minimum value are represented in white in respective rows and respective columns, and a pixel at the center position $(x_{min0},y_{min0})$ in the flat area detected in step S3 is hatched.

The minimum value of the flatness which is detected from each row of the flatness map $M_{flat\_v}$ in the vertical direction has a value nearest to zero in each row. Therefore, as illustrated in FIG. 12, the first correction gain calculation unit 123a inserts pixels having a pixel value of zero for each row of the flatness map $M_{flat\_h}$, within a range of the width $B_x/2$ on both right and lefts sides of a position $(x_{min},y)$ with a flatness having a minimum value. The range of pixels having a pixel value of zero, $(x_{min}-B_x/2) \le x \le (x_{min}+B_x/2)$ is treated as the flat area in the row. Note that the total number of pixels having a width equivalent to the width $B_x$ are inserted so that the size of the flatness map $M_{flat\_h}$ is made equal to the original image sizes of the images M1 and M2, and the margin m1 is eliminated.

Similarly, as illustrated in FIG. 13, the second correction gain calculation unit 123b inserts pixels having a pixel value of zero for each column of the flatness map $M_{flat\_v}$, within a range of the width $B_y/2$ on both right and lefts sides of a position $(x,y_{min})$ with a flatness having a minimum value. The range of pixels having a pixel value of zero, $(y_{min}-B_y/2) \le y \le (y_{min}+B_y/2)$ is treated as the flat area in the column. Note that the total number of pixels having a width equivalent to the width $B_y$ are inserted so that the size of the flatness map $M_{flat\_v}$ is made equal to the original image sizes of the images M2 and M3, and the margin m2 is eliminated.

Then, in the first correction gain calculation unit 123a a correction gain of a flat area in each row of the flatness map $M_{flat\_h}$ is assumed 1, and a correction gain $Gh(x,y)$ for correcting a shading component $Sh(x,y)$ in a horizontal direction at each pixel position is calculated according to the followings (I) to (III).

In case of $(x_{min}-B_x/2) \le x \le (x_{min}+B_x/2)$      (I)

In this case, correction gain $Gh(x,y)=1$, as described above.

In case of $(x_{min}+B_x/2)<x$      (II)

In this case, as illustrated in FIG. 5, the texture component $T_1(x,y)$ at the position $(x,y)$ in the image M1 and the texture component $T_2(x-B_x,y)$ at the position $(x-B_x,y)$ in the image M2 are common. Accordingly, the following formula (15) holds.

$$\frac{I_1(x, y)}{Sh(x, y)} = \frac{I_2(x - B_x, y)}{Sh(x - B_x, y)} \tag{15}$$

Accordingly, a shading component $Sh(x,y)$ in a horizontal direction is given by the following formula (16).

$$Sh(x, y) = \frac{I_1(x, y)}{I_2(x - B_x, y)} \times Sh(x - B_x, y) \tag{16}$$

Since the correction gain is an inverse of the shading component, a correction gain $Gh(x,y)$ in a horizontal direction for correcting the shading component $Sh(x,y)$ in a horizontal direction is given by the following formula (17).

$$Gh(x, y) = \frac{I_2(x - B_x, y)}{I_1(x, y)} \times Gh(x - B_x, y) \tag{17}$$

Similarly, the correction gain $Gh(x-B_x,y)$ shown in formula (17) is given by the following formula (18).

$$Gh(x - B_x, y) = \frac{I_2(x - 2B_x, y)}{I_1(x - B_x, y)} \times Gh(x - 2B_x, y) \tag{18}$$

Based on formulas (17) and (18), the correction gain $Gh(x,y)$ may be transformed into the following formula (19).

$$Gh(x, y) = \frac{I_2(x - B_x, y)}{I_1(x, y)} \times \frac{I_2(x - 2B_x, y)}{I_1(x - B_x, y)} \times Gh(x - 2B_x, y) \tag{19}$$

As described above, after $Gh(x-B_x,y)$, $Gh(x-2B_x,y)$, . . . , $Gh(x-iB_x,y)$, . . . are sequentially substituted for the correction gain $Gh(x,y)$ (i=1, 2, . . . , and n), in a flat area in a relevant row, a correction gain $Gh(x-nB_x,y)$ eventually reaches 1. That is, the correction gain $Gh(x,y)$ at any position $(x,y)$, where $(x_{min}+B_x/2)<x$, is given by the following formula (20).

$$Gh(x, y) = \frac{I_2(x - B_x, y)}{I_1(x, y)} \times \frac{I_2(x - 2B_x, y)}{I_1(x - B_x, y)} \times \ldots \times \tag{20}$$

$$\frac{I_2(x - iB_x, y)}{I_1(x - (i-1)B_x, y)} \times \ldots \times \frac{I_2(x - nB_x, y)}{I_1(x - (n-1)B_x, y)} \times Gh(x - nB_x, y)$$

In formula (20), $Gh(x-nB_x,y)=1$.

In case of $x<(x_{min}-B_x/2)$      (III)

In this case, a texture component $T_1(x+B_x,y)$ at a position $(x+B_x,y)$ in the image M1, and a texture component $T_2(x,y)$ at a position $(x,y)$ in the image M2 are common. Accordingly, the following formula (21) holds.

$$\frac{I_1(x+B_x, y)}{Sh(x+B_x, y)} = \frac{I_2(x, y)}{Sh(x, y)} \tag{21}$$

Accordingly, the correction gain $Gh(x,y)$ for correcting the shading component $Sh(x,y)$ in a horizontal direction is given by the following formula (22).

$$Gh(x, y) = \frac{1}{Sh(x, y)} = \frac{I_1(x+B_x, y)}{I_2(x, y)} \times Gh(x+B_x, y) \tag{22}$$

As in (II) described above, after $Gh(x+B_x,y)$, $Gh(x+2B_x, y)$, ..., $Gh(x+iB_x,y)$, ... are sequentially substituted for the correction gain $Gh(x,y)$ ($i=1, 2, \ldots$, and n), in a flat area in a relevant row, a correction gain $Gh(x+nB_x,y)$ reaches 1. That is, the correction gain $Gh(x,y)$ at any position $(x,y)$, where $x<(x_{min}-B_x/2)$, is given by the following formula (23).

$$Gh(x, y) = \frac{I_1(x+B_x, y)}{I_2(x, y)} \times \frac{I_1(x+2B_x, y)}{I_2(x+B_x, y)} \times \ldots \times \tag{23}$$
$$\frac{I_1(x+iB_x, y)}{I_2(x+(i-1)B_x, y)} \times \ldots \times \frac{I_1(x+nB_x, y)}{I_2(x+(n-1)B_x, y)} \times Gh(x+nB_x, y)$$

In formula (23), $Gh(x+nB_x,y)=1$.

Then, in the second correction gain calculation unit 123b, a correction gain of a flat area in each column of the flatness map $M_{flat\_v}$ is assumed 1, and a correction gain $Gv(x,y)$ for correcting a shading component $Sv(x,y)$ in a vertical direction at each pixel position is calculated according to the followings (IV) to (VI).

In case of $(y_{min}-B_y/2) \leq y \leq (y_{min}+B_y/2)$ (IV)

In this case, as described above, correction gain $Gv(x,y)=1$.

In case of $(y_{min}+B_y/2)<y$ (V)

In this case, as in (II) described above, the correction gain $Gv(x,y)$ is given by formula (24) where $Gv(x,y-B_y)$, $Gv(x, y-2B_y)$, ... are sequentially substituted for the correction gain $Gv(x,y)$.

$$Gv(x, y) = \frac{I_3(x, y-B_y)}{I_2(x, y)} \times \frac{I_3(x, y-2B_y)}{I_2(x, y-B_y)} \times \ldots \times \tag{24}$$
$$\frac{I_3(x, y-iB_y)}{I_2(x, y-(i-1)B_y)} \times \ldots \times \frac{I_3(x, y-nB_y)}{I_2(x, y-(n-1)B_y)} \times Gv(x, y-nB_y)$$

In formula (24), $Gv(x,y-nB_y)=1$.

In case of $y<(y_{min}-B_y/2)$ (VI)

In this case, as in (III) described above, the correction gain $Gv(x,y)$ is given by formula (25) where $Gv(x,y+B_y)$, $Gv(x, y+2B_y)$, ... are sequentially substituted for the correction gain $Gv(x,y)$.

$$Gv(x, y) = \frac{I_2(x, y+B_y)}{I_3(x, y)} \times \frac{I_2(x, y+2B_y)}{I_3(x, y+B_y)} \times \ldots \times \tag{25}$$
$$\frac{I_2(x, y+iB_y)}{I_3(x, y+(i-1)B_y)} \times \ldots \times \frac{I_2(x, y+nB_y)}{I_3(x, y+(n-1)B_y)} \times Gv(x, y+nB_y)$$

In formula (25), $Gv(x,y+nB_y)=1$.

In next step S5, the normalized correction gain calculation unit 123c normalizes the correction gains $Gh(x,y)$ and $Gv(x,y)$ for respective directions calculated in step S4, with reference to the correction gain at the center position $(x_{min0}, y_{min0})$ in the flat area determined in step S3.

Figure 14:
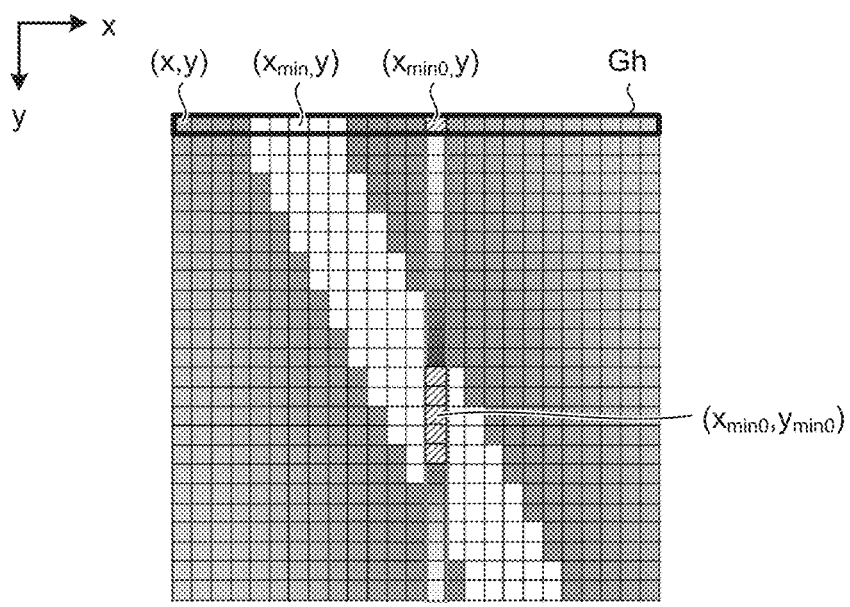
FIG. 14 is a schematic diagram illustrating a process of normalizing a correction gain.

Firstly, as illustrated in FIG. 14, the normalized correction gain calculation unit 123c normalizes the correction gain $Gh(x,y)$ in a horizontal direction at any position $(x,y)$, with reference to a correction gain $Gh(x_{min0},y)$ in a horizontal direction at a position $(x_{min0},y)$ belonging to the same y row as the position $(x,y)$ and belonging to the same $x_{min0}$ column as the center position $(x_{min0},y_{min0})$. That is, $Gh(x,y)/Gh(x_{min0},y)$ is calculated.

At this position $(x_{min0},y)$, a correction gain $Gv(x_{min0},y)$ in a vertical direction is obtained, with reference to the correction gain at the center position $(x_{min0},y_{min0})$. Accordingly, a normalized correction gain $Ghv(x,y)$ obtained by normalizing the correction gain $Gh(x,y)$ in a horizontal direction at the position $(x,y)$ by the correction gain at the center position $(x_{min0},y_{min0})$ is given by the following formula (26).

$$Ghv(x, y) = \frac{Gh(x, y)}{Gh(x_{min0}, y)} \times Gv(x_{min0}, y) \tag{26}$$

Figure 15:
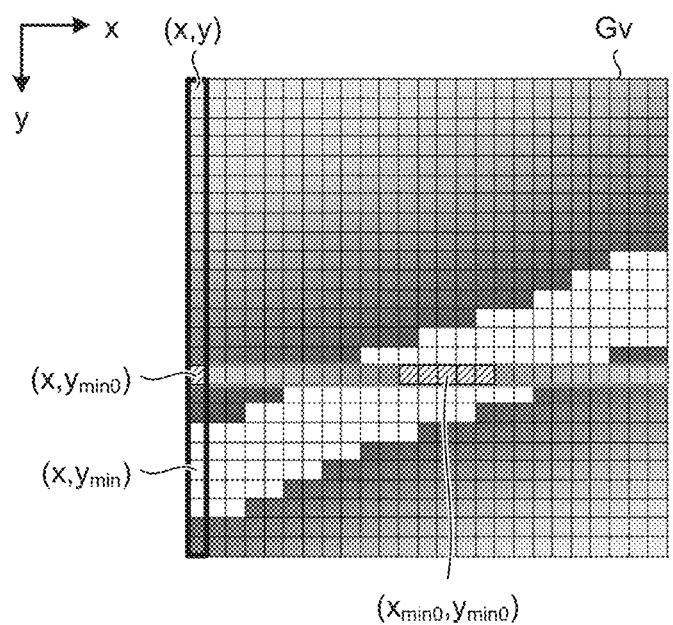
FIG. 15 is a schematic diagram illustrating a process of normalizing a correction gain.

Furthermore, as illustrated in FIG. 15, the normalized correction gain calculation unit 123c normalizes, with reference to a correction gain $Gv(x,y_{min0})$ in a vertical direction at a position $(x,y_{min0})$ belonging to the same x column as the position $(x,y)$ and belonging to the same $y_{min0}$ row as the center position $(x_{min0},y_{min0})$. That is, $Gv(x,y)/Gv(x,y_{min0})$ is calculated.

At this position $(x,y_{min0})$, a correction gain $Gh(x,y_{min0})$ in a horizontal direction is obtained, with reference to the correction gain at the center position $(x_{min0},y_{min0})$. Accordingly, a normalized correction gain $Gvh(x,y)$ obtained by normalizing the correction gain $Gv(x,y)$ in a vertical direction at the position $(x,y)$ by the correction gain at the center position $(x_{min0},y_{min0})$ is given by the following formula (27).

$$Gvh(x, y) = \frac{Gv(x, y)}{Gv(x, y_{min0})} \times Gh(x, y_{min0}) \tag{27}$$

Furthermore, the normalized correction gain calculation unit 123c combines the normalized correction gains $Ghv(x,y)$ and $Gvh(x,y)$ calculated for the same position $(x,y)$, by weighted average, as shown in the following formula (28).

$$G(x,y)=(Ghv(x,y)+Gvh(x,y))/2 \tag{28}$$

This combined correction gain $G(x,y)$ is used as a correction gain at the position $(x,y)$. The process in next step S6 is similar to that in the first embodiment.

Figure 16:
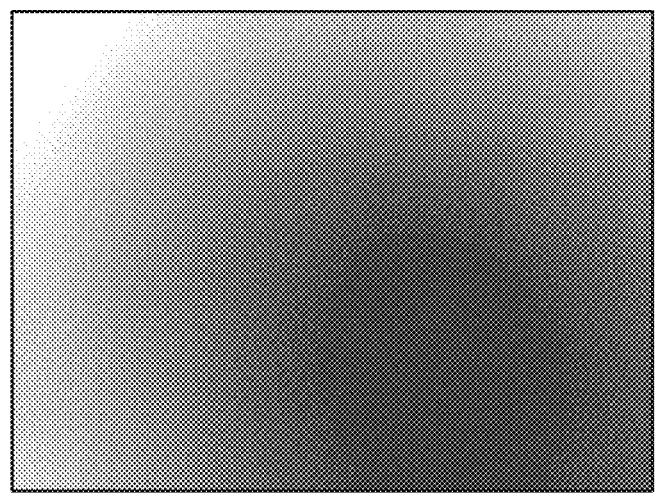
FIG. 16 is a diagram illustrating a correction gain map generated with reference to a correction gain in a flat area detected from the image illustrated in FIG. 5.
Figure 17:
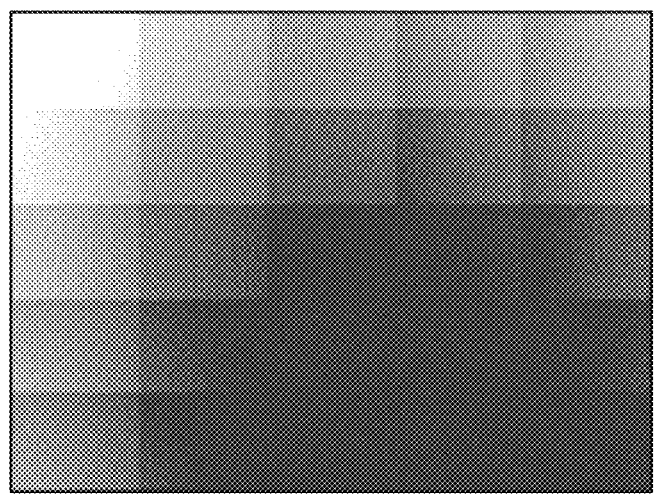
FIG. 17 is a diagram illustrating a correction gain map generated with reference to a correction gain at the center of the image illustrated in FIG. 5.

FIG. 16 is a diagram illustrating a correction gain map generated with reference to the correction gains in the flat areas detected from the images M1 and M2 illustrated in FIG. 5. In contrast, FIG. 17 is a diagram illustrating a correction gain map generated with reference to the correction gains at the centers of the images M1 and M2 illustrated in FIG. 5. As illustrated in FIG. 17, when the center of an image and the center position of a flat area are not coincide with each other, a small section at the center of the image which is assumed to be flat actually has a difference in shading at a right and left ends and an upper and lower ends thereof, discontinuation occurs at a joined portion, and a grid-shaped artifact is generated on a correction gain map. In contrast, as illustrated in FIG. 16, with reference to a correction gain at an actual center position of the flat area, smooth and accurate correction gains without artifact may be obtained.

As described above, according to the second embodiment, since a correction gain is calculated, based on the center position of a flat area in an image in which shading hardly occurs and which has a flat gradient of shading, smooth and accurate correction gains may be obtained. Accordingly, use of such a correction gain enables highly accurate shading correction.

Modification 2-1

In the above second embodiment, as illustrated in formula (28), the normalized correction gains Ghv(x,y) and Gvh(x,y) are subjected to weighted average to calculate the correction gain G(x,y) at the position (x,y), but any of the normalized correction gains Ghv(x,y) and Gvh(x,y) may be directly used as the correction gain G(x,y) at the position (x,y). In this case, only any one of the normalized correction gains Ghv(x,y) and Gvh(x,y) is preferably calculated.

Modification 2-2

Figure 18:
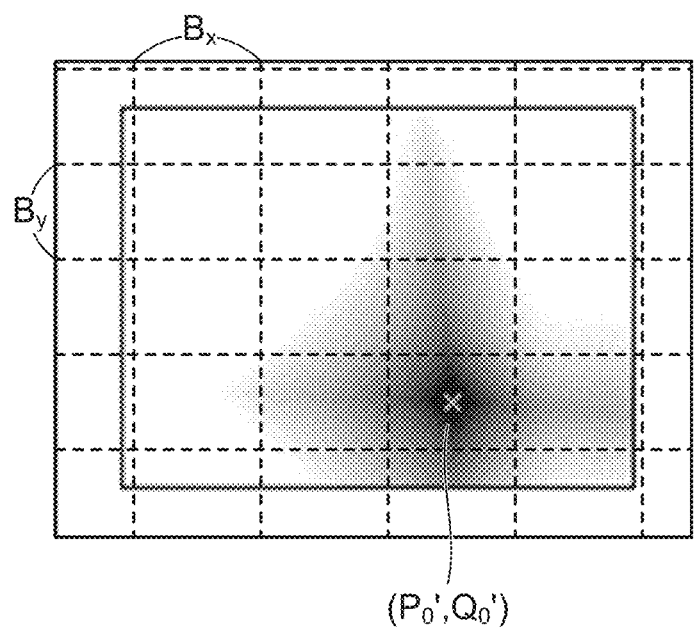
FIG. 18 is a schematic diagram illustrating a method of calculating a correction gain according to a modification 2-2 of a second embodiment.

FIG. 18 is a schematic diagram illustrating a method of calculating a correction gain according to a modification 2-2 of the second embodiment. In the above second embodiment, the correction gains for respective directions are calculated with the widths of each row and column as one pixel, but a similar processing may be performed with the widths of each row and column as a plurality of pixels. As an example, the first correction gain calculation unit 123a and the second correction gain calculation unit 123b divide an image into small sections having widths (displacement) $B_x$ and $B_y$ by which the field of view V is shifted, about a flat area, in each of a row direction and a column direction, and calculate a correction gain for each direction with reference to each of a row and a column of a small section including the flat area. The normalized correction gain calculation unit 123c normalizes the correction gain for each direction thus calculated, with reference to a correction gain in a small section $(P_0',Q_0')$ including the flat area in the whole image.

Third Embodiment

Figure 19:
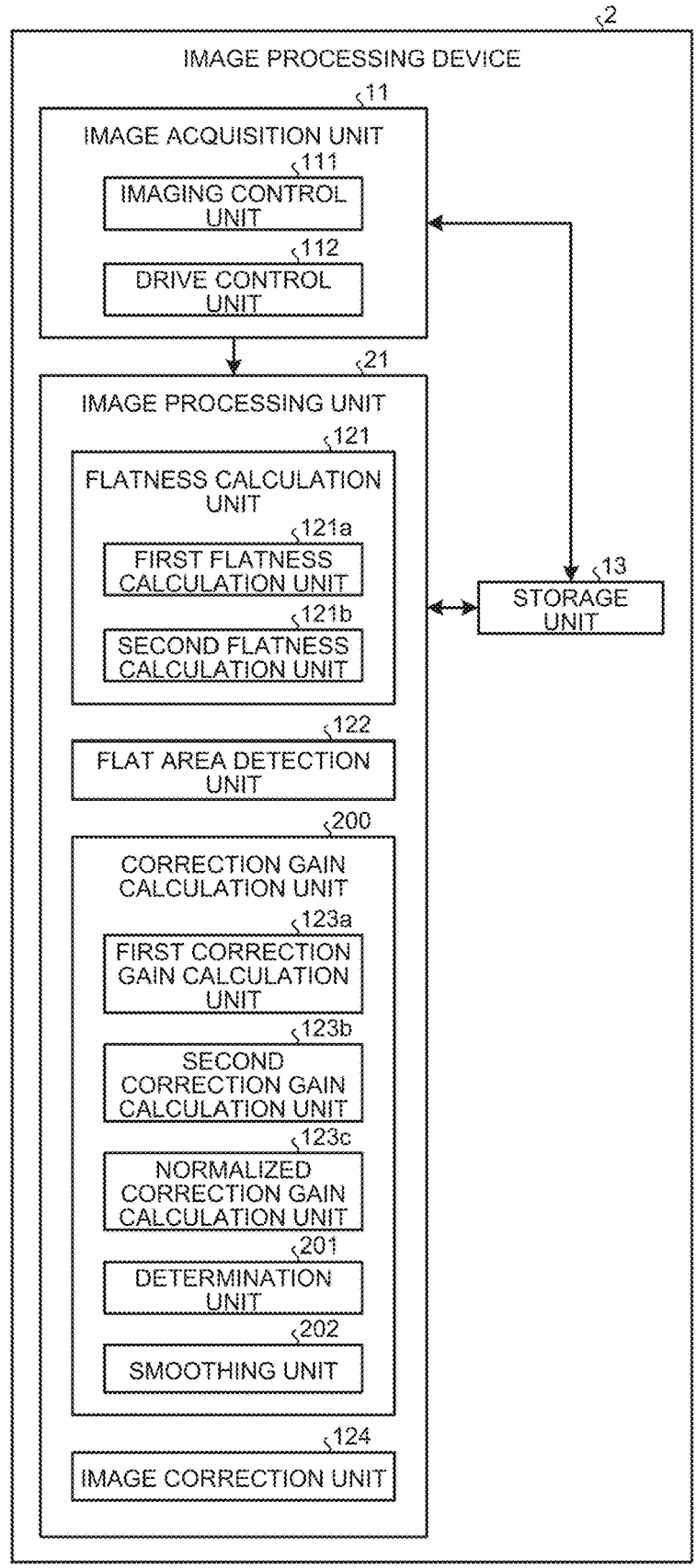
FIG. 19 is a block diagram illustrating an exemplary configuration of an image processing device according to a third embodiment.

Next, a third embodiment will be described. FIG. 19 is a block diagram illustrating an exemplary configuration of an image processing device according to a third embodiment. As illustrated in FIG. 19, an image processing device 2 according to the present third embodiment includes an image processing unit 21, instead of the image processing unit 12 illustrated in FIG. 1. Configurations and operations of units of the image processing device 2 other than the image processing unit 21 are similar to those of the first embodiment.

The image processing unit 21 includes the flatness calculation unit 121, the flat area detection unit 122, a correction gain calculation unit 200, and the image correction unit 124. Of these, operations of the flatness calculation unit 121, the flat area detection unit 122, and the image correction unit 124 are similar to those of the first embodiment.

The correction gain calculation unit 200 includes a determination unit 201 and a smoothing unit 202, in addition to the first correction gain calculation unit 123a, the second correction gain calculation unit 123b, and the normalized correction gain calculation unit 123c. Of these, operations of the first correction gain calculation unit 123a, the second correction gain calculation unit 123b, and the normalized correction gain calculation unit 123c are similar to those of the first embodiment. Alternatively, processing similar to that of the second embodiment may be performed.

The determination unit 201 determines whether flatness calculated by the flat area detection unit 122 upon detection of a flat area has a minimum value not more than a threshold. This threshold is set in advance for use in determining whether a center position of the flat area is within an image. Here, when the center position of the flat area is within the image, the gradient of the shading component is almost zero, or the minimum value of the flatness is almost zero, and a position having the minimum value is detected as the center position of the flat area. Therefore, as the threshold, a value considered to be within a margin of error of zero in flatness is preferably set.

When the determination unit 201 determines that a minimum value of the flatness is larger than the threshold, the smoothing unit 202 performs a smoothing process on a correction gain calculated by the normalized correction gain calculation unit 123c.

As described in the above first or second embodiment, the center position of the flat area is detected from the image, a correction gain in another area in the image is calculated with reference to a correction gain at the center position, and the image may be subjected to highly accurate shading correction. However, a center position of a flat area is not always within an image.

Figure 20:
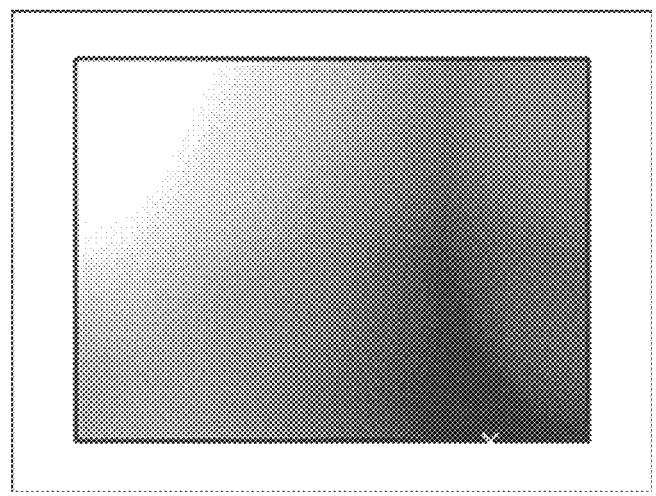
FIG. 20 is a diagram illustrating a flatness map where the center of a flat area is not within an image.

FIG. 20 is a diagram illustrating a flatness map where a center position of a flat area is not within an image. As illustrated in FIG. 20, when the center position of the flat area is not within the image, shading is generated also at a position with a flatness having a minimum value in the image. Nevertheless, when a correction gain at another area is calculated with reference to the correction gain at this position, or assuming that the correction gain is 1, the calculated correction gain causes a large error or artifact.

Figure 21:
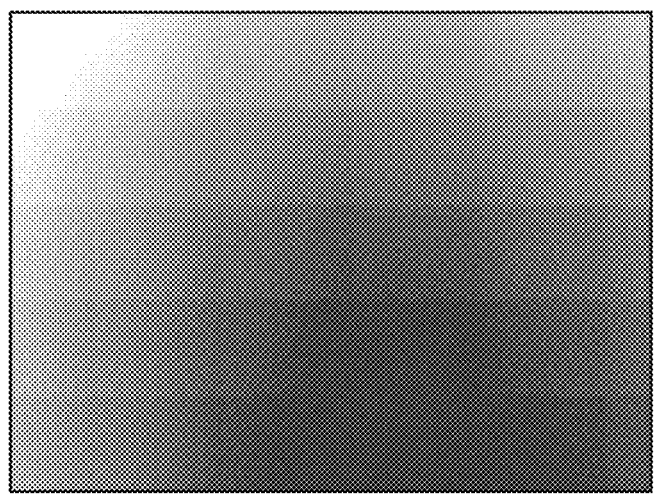
FIG. 21 is a diagram illustrating a correction gain map generated based on the flatness map illustrated in FIG. 20.

FIG. 21 is a diagram illustrating a correction gain map generated based on the flatness map illustrated in FIG. 20. As illustrated in FIG. 21, when the center position of the flat area is not within the image, for example, a grid-shaped artifact is generated on a correction gain map, as illustrated in FIG. 21.

Therefore, the determination unit 201 determines whether a minimum value of the flatness is not more than the threshold to determine whether the center position of the flat area is within the image. Then, when a minimum value of the flatness is larger than the threshold, that is, when the center position of the flat area is not within the image, the smoothing unit 202 performs the smoothing process on a correction gain calculated by the normalized correction gain calculation unit 123c. The kind of smoothing process is not particularly limited, and, for example, a general smoothing process such as Gaussian filter is preferably applied. At that time, the smoothing unit 202 may change a parameter σ or a filter size in the Gaussian filter, according to the size of the minimum value of the flatness. Specifically, the parameter σ or the filter size is preferably increased with increase in minimum value of the flatness.

Figure 22:
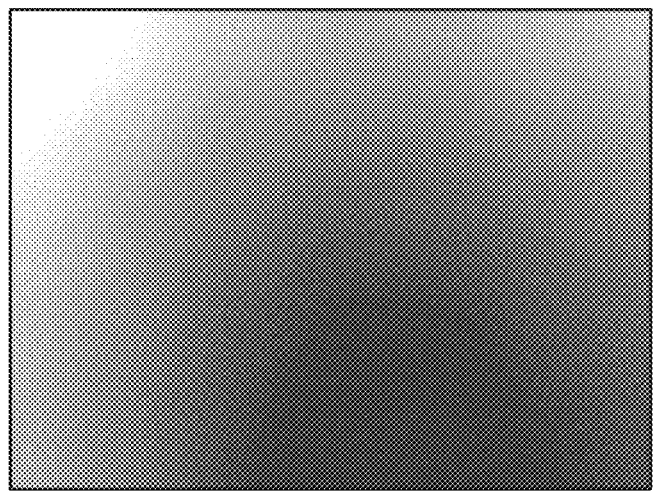
FIG. 22 is a diagram illustrating a correction gain map generated based on the flatness map illustrated in FIG. 20, and further subjected to a smoothing process.

FIG. 22 is a diagram illustrating a correction gain map generated based on the flatness map illustrated in FIG. 20, and further subjected to a smoothing process. As illustrated in FIG. 22, the smoothing process is performed, and the artifact may be suppressed.

As described above, according to the third embodiment, even when a center position of a flat area is not within an image, generation of artifact in shading correction may be suppressed.

Fourth Embodiment

Figure 23:
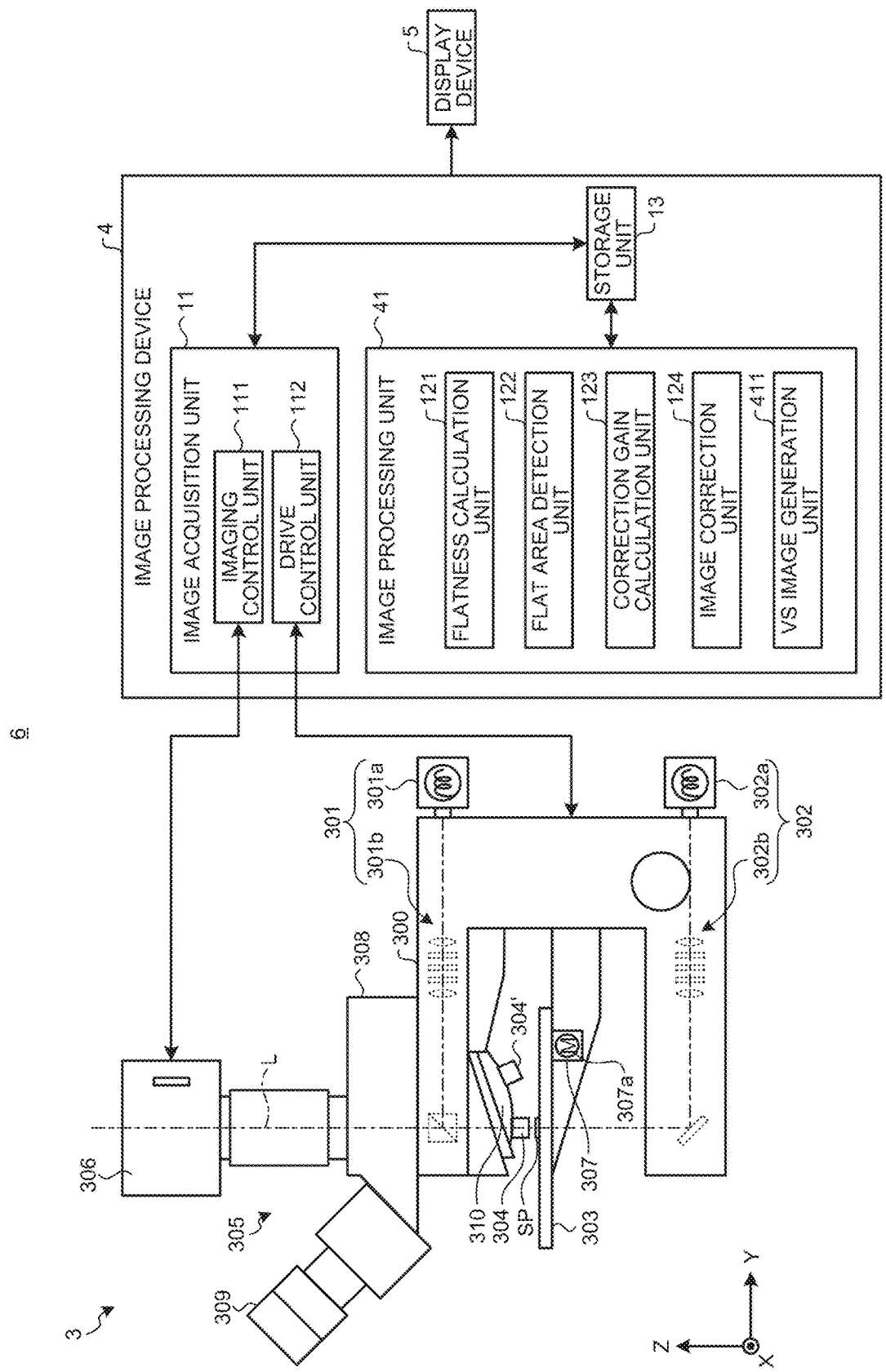
FIG. 23 is a diagram illustrating an exemplary configuration of a microscope system according to a fourth embodiment.

Next, a fourth embodiment will be described. FIG. 23 is a diagram illustrating an exemplary configuration of a microscope system according to the fourth embodiment. As illustrated in FIG. 23, a microscope system 6 according to the present fourth embodiment includes a microscope device 3, an image processing device 4, and a display device 5.

The microscope device 3 includes an arm 300 having a substantially C-shape and provided with an epi-illumination unit 301 and a transmitting illumination unit 302, a specimen stage 303 mounted to the arm 300 and mounting an object SP to be observed thereon, an objective lens 304 provided at one end of a lens barrel 305 to face the specimen stage 303 through a trinocular lens barrel unit 308, an imaging unit 306 provided at the other end of the lens barrel 305, and a stage position changing unit 307 configured to move the specimen stage 303. The trinocular lens barrel unit 308 divides observation light for an object SP entering from the objective lens 304 to the imaging unit 306 and an eyepiece lens unit 309 described later. The eyepiece lens unit 309 is used for a user to directly observe the object SP.

The epi-illumination unit 301 includes an epi-illumination light source 301a and an epi-illumination optical system 301b to emit epi-illumination light to the object SP. The epi-illumination optical system 301b includes various optical members configured to focus and guide illumination light emitted from the epi-illumination light source 301a toward an observation optical path L, specifically, includes a filter unit, a shutter, a field stop, an aperture diaphragm, and the like.

The transmitting illumination unit 302 includes a transmitting illumination light source 302a and a transmitting illumination optical system 302b to emit transmitting illumination light to the object SP. The transmitting illumination optical system 302b includes various optical members configured to focus and guide illumination light emitted from the transmitting illumination light source 302a toward the observation optical path L, specifically, includes a filter unit, a shutter, a field stop, an aperture diaphragm, and the like.

The objective lens 304 is mounted to a revolver 310 which is configured to hold a plurality of objective lenses having different magnifications, for example, objective lenses 304 and 304'. The revolver 310 is rotated to change the objective lenses 304 and 304' to face the specimen stage 303, and imaging magnification may be changed.

The lens barrel 305 is internally provided with a zoom unit including a plurality of zoom lenses and a drive unit configured to change the positions of these zoom lenses. The zoom unit adjusts the positions of the zoom lenses to enlarge or reduce an object image in a field of view. Note that the drive unit in the lens barrel 305 may be further provided with an encoder. In this configuration, an output value from the encoder may be output to the image processing device 4 so that the positions of the zoom lenses are detected based on the output value from the encoder to automatically calculate imaging magnification in the image processing device 4.

The imaging unit 306 is a camera including, for example, an image sensor such as a CCD or CMOS sensor, and capturing a color image having pixel levels (pixel values) in R (red), G (green), and B (blue) bands for each pixel included in the image sensor, and the imaging unit 306 is operated at predetermined appropriate time according to control by an imaging control unit 111 of the image processing device 4. The imaging unit 306 receives light (observation light) entering from the objective lens 304 through an optical system in the lens barrel 305, generates image data corresponding to the observation light, and output the image data to the image processing device 4 Alternatively, the imaging unit 306 may convert pixel values represented in an RGB color space to pixel values represented in an YCbCr color space, and output the pixel values to the image processing device 4.

The stage position changing unit 307 is a movement unit which includes, for example, a ball screw and a stepping motor 307a, and moves the position of the specimen stage 303 in an XY plane to change the field of view. Furthermore, the stage position changing unit 307 moves the specimen stage 303 along a Z axis to focus the objective lens 304 on the object SP. Note that the configuration of the stage position changing unit 307 is not limited to the above configuration, and may use, for example, an ultrasonic motor or the like.

Note that in the present fourth embodiment, the position of the optical system including the objective lens 304 is fixed and the specimen stage 303 is moved to change the field of view relative to the object SP, but a movement mechanism configured to move the objective lens 304 in a plane orthogonal to an optical axis may be provided to fix the specimen stage 303, move the objective lens 304, and change the field of view. Alternatively, both of the specimen stage 303 and the objective lens 304 may be moved relatively.

The image processing device 4 includes an image acquisition unit 11, an image processing unit 41, and a storage unit 13. Of these, configurations and operations of the image acquisition unit 11 and the storage unit 13 are similar to those of the first embodiment (see FIG. 1). In the image acquisition unit 11, a drive control unit 112 specifies driving coordinates of the specimen stage 303 at a predetermined pitch, based on a value of the like of a scale mounted to the specimen stage 303 to control the position of the specimen stage 303, but the drive control unit 112 may control the position of the specimen stage 303, based on a result of image matching, such as template matching, performed based on an image acquired by the microscope device 3. According to the present fourth embodiment, since the field of view V only needs to be moved in a plane of the object SP in a vertical direction, after moved in a horizontal direction, the specimen stage 303 may be readily controlled.

The image processing unit 41 further includes a VS image generation unit 411 in contrast to the image processing unit 12 illustrated in FIG. 1. The VS image generation unit 411 generates a virtual slide (VS) image, based on a plurality of images subjected to shading correction by the image correction unit 124. Note that configurations and operations of units of the image processing unit 41 other than the VS image generation unit 411 are similar to those of the first embodiment. Alternatively, processing similar to that of the second embodiment may be performed, or the correction gain calculation unit 200 may be provided as in the third embodiment.

The virtual slide image is an image having a wide field of view generated by stitching a plurality of images having different fields of view, and this microscope system 6 includes a virtual slide image generating function. Here, when images captured by the microscope device 3 are directly stitched, an unnatural boundary is generated at a seam where images are stitched, due to influence of shading generated depending on the characteristics or the like of an optical system. Therefore, in the present fourth embodiment, the image correction unit 124 stitches images after shading correction.

The display device 5 includes a display device, such as an LCD or EL display or a CRT display, and displays an image or related information output from the image processing device 4.

Figure 24:
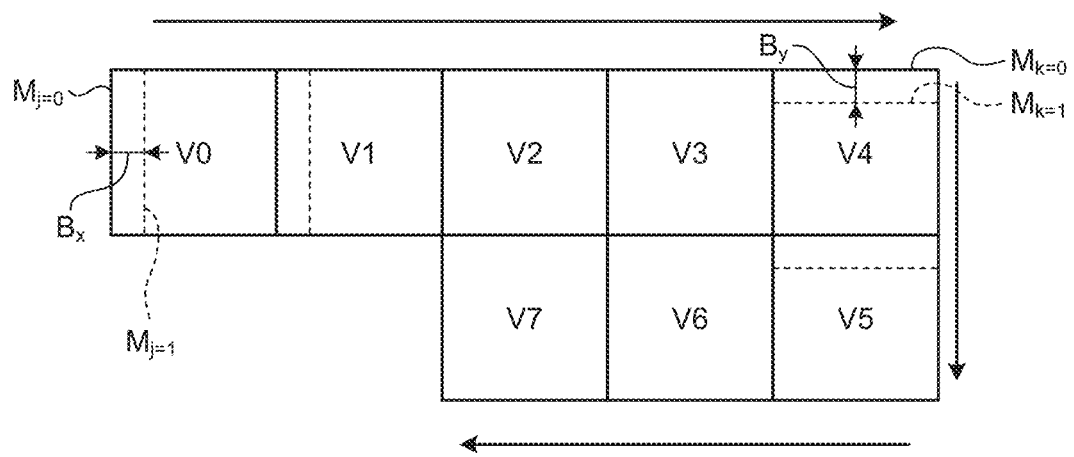
FIG. 24 is a schematic diagram illustrating image acquisition operation in the microscope system illustrated in FIG. 23.

FIG. 24 is a schematic diagram illustrating image acquisition operation in the microscope system 6. In this microscope system 6, acquisition of an image for virtual slide image generation, and acquisition of an image for correction gain calculation may be combined.

For example, as illustrated in FIG. 24, when images V0 to V7 for virtual slide image generation are acquired, a movement pitch of the field of view is set, for example, to a width $B_x$ to perform imaging, on the way the field of view is horizontally moved, for example, while acquisition of the images V0 and V1, and images $M_{j=0}$ and $M_{j=1}$ are acquired for calculation of a correction gain in a horizontal direction. Of these, the image $M_{j=0}$ and the image V0 have a common object in the fields of view, and the images may be used in common. In addition, a movement pitch of the field of view is set, for example, to a width $B_y$ to perform imaging, on the way the field of view is vertically moved, for example, during acquisition of the images V4 and V5, and images $M_{k=0}$ and $M_{k=1}$ are acquired for calculation of a correction gain in a vertical direction. Of these, the image $M_{k=0}$ and the image V4 have a common object in the fields of view, and the images may be used in common. Furthermore, while the images V0, V1, . . . are captured, correction gains may be simultaneously calculated from the acquired images $M_{j=0}$ and $M_{j=1}$, or the calculated correction gains may be simultaneously used to perform shading correction.

As described above, in the present fourth embodiment, since a movement direction of the field of view upon acquisition of an image for virtual slide image generation, and a movement direction of the field of view upon acquisition of an image for shading component calculation are common, the specimen stage 303 is not moved unnecessarily, and these images may be effectively acquired. Furthermore, part of images for virtual slide image generation may be used for shading component generation, and the number of times of imaging may be reduced.

Note that a position for acquisition of an image for correction gain calculation may be appropriately set on an image acquisition path for virtual slide image generation. Furthermore, images for correction gain calculation may be acquired at a plurality of points on the image acquisition path for virtual slide image generation to combine correction gains calculated whenever images are acquired. In this configuration, a combined correction gain may be used to improve robustness in the shading correction.

According to the present disclosure, an area in which a shading component has a minimum gradient in both of first and second directions is detected as a flat area to calculate a correction gain for each area in an image with reference to a correction gain in the flat area, and thus, even when shading is generated at the center of an image, shading correction may be highly accurately performed.

It is to be understood that the present disclosure is not limited to the first to fourth embodiments and modifications thereof, and the present disclosure may be variously made by appropriately combining the components disclosed in the first to fourth embodiments and modifications thereof. For example, the present disclosure may be made removing some component elements from all components described in the first to fourth embodiments and the modifications thereof. Alternatively, the present disclosure may be made appropriately combining components described in different embodiments.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing device comprising:
   a processor comprising hardware, the processor being configured to:
      acquire first and second image groups in different first and second directions, the first and second image groups each including two images having a common area partially showing a common object between one image and another image;
      calculate first flatness representing a gradient of a shading component in the first direction based on a luminance ratio in the common area between the two images included in the first image group, and calculate second flatness representing a gradient of a shading component in the second direction based on a luminance ratio in the common area between the two images included in the second image group;
      detect an area, as a flat area, including a position having a minimum gradient of a shading component in an image based on the first and second flatness; and
      calculate a correction gain for correcting shading in an image with reference to a correction gain in the flat area by using a luminance ratio in the common area.

2. The image processing device according to claim 1, wherein the processor is further configured to use the calculated correction gain to perform shading correction on at least one image included in the first and second image groups.

3. The image processing device according to claim 1, wherein the calculation of the correction gain comprises:
   calculating a first correction gain with reference to a position having a flatness that is a combined flatness of the first flatness and the second flatness being minimum in the first direction based on a luminance ratio in the common area between the two images included in the first image group;
   calculating a second correction gain with reference to a position having the flatness being minimum in the second direction based on a luminance ratio in the common area between the two images included in the second image group; and
   performing a normalizing process using the first and second correction gains to calculate a correction gain with reference to a correction gain of the flat area.

4. The image processing device according to claim 3, wherein
   the calculation of the first correction gain calculates the first correction gain for rows having pixels aligned in the first direction, and
   the calculation of the second correction gain calculates the second correction gain for columns having pixels aligned in the second direction.

5. The image processing device according to claim 4, wherein the normalizing process performs at least one of:
   a first process of normalizing the first correction gain in each of the rows with reference to the first correction gain in a column including the flat area, and calculating a first normalized correction gain with reference to the flat area by using the normalized first correction gain and the second correction gain in the column including the flat area, and
   a second process of normalizing the second correction gain in each of the columns with reference to the second correction gain in a row including the flat area, and calculating a second normalized correction gain with reference to the flat area by using the normalized second correction gain and the first correction gain in the row including the flat area.

6. The image processing device according to claim 5, wherein the normalizing process performs both of the first and second processes to further combine the first and second normalized correction gains calculated for a same area.

7. The image processing device according to claim 1, wherein the calculation of the correction gain comprises:
   calculating a first correction gain with reference to a column including the flat area in each of a plurality of columns obtained by dividing an image in the first direction based on a luminance ratio in the common area between the two images included in the first image group;
   calculating a second correction gain with reference to a row including the flat area in each of a plurality of rows obtained by dividing an image in the second direction based on a luminance ratio in the common area between the two images included in the second image group; and
   performing a normalizing process using the first and second correction gains to calculate a correction gain with reference to a correction gain of the flat area.

8. The image processing device according to claim 7, wherein
   the calculation of the first correction gain divides the image about the flat area at an interval of displacement between the two images in the first direction, and
   the calculation of the second correction gain divides the image about the flat area at an interval of displacement between the two images in the second direction.

9. The image processing device according to claim 1, wherein the calculation of the correction gain comprises:
   determining whether a flatness that is a combined flatness of the first flatness and the second flatness has a minimum value not more than a threshold; and
   performing a smoothing process on the correction gain calculated with reference to a correction gain in the flat area when the flatness has a minimum value larger than a threshold.

10. The image processing device according to claim 9, wherein the smoothing process changes a parameter in the smoothing process based on a minimum value of the flatness.

11. An imaging device comprising:
   the image processing device according to claim 1;
   an optical system configured to form an image of the object;
   an actuator configured to move at least one of the object and the optical system to move a field of view of the optical system relative to the object; and
   an imaging sensor configured to capture an image of the object formed by the optical system,
   wherein the processor controls the imaging sensor to perform imaging, while causing the actuator to move the field of view in the first and second directions, to acquire the first and second image groups.

12. A microscope system comprising:
   the imaging device according to claim 11; and
   a stage configured to mount the object thereon,
   wherein the actuator moves at least one of the stage and the optical system.

13. An image processing method comprising:
   acquiring first and second image groups in different first and second directions, the first and second image groups each including two images having a common area partially showing a common object between one image and the other image;
   calculating first flatness representing a gradient of a shading component in the first direction based on a luminance ratio in the common area between the two images included in the first image group;
   calculating second flatness representing a gradient of a shading component in the second direction based on a luminance ratio in the common area between the two images included in the second image group;
   detecting, as a flat area, an area including a position having a minimum gradient of a shading component in an image based on the first and second flatness; and
   calculating a correction gain for correcting shading in an image with reference to a correction gain in the flat area by using a luminance ratio in the common area.

14. A non-transitory computer-readable recording medium with an executable program stored thereon, the program causing a processor to execute:
   acquiring first and second image groups in different first and second directions, the first and second image groups each including two images having a common area partially showing a common object between one image and the other image;
   calculating first flatness representing a gradient of a shading component in the first direction based on a luminance ratio in the common area between the two images included in the first image group;
   calculating second flatness representing a gradient of a shading component in the second direction based on a luminance ratio in the common area between the two images included in the second image group;
   detecting, as a flat area, an area including a position having a minimum gradient of a shading component in an image based on the first and second flatness; and
   calculating a correction gain for correcting shading in an image, with reference to a correction gain in the flat area, using a luminance ratio in the common area.

* * * * *